United States Patent

Takagi et al.

[11] Patent Number: 6,081,056
[45] Date of Patent: Jun. 27, 2000

[54] MOTOR AND METHOD FOR PRODUCING THE SAME

[75] Inventors: Kunihiko Takagi; Michio Sato; Akiyoshi Ishiguro; Kunio Tabata; Osamu Shinkawa, all of Nagano, Japan

[73] Assignee: Seiko Epson Corporation, Nagano, Japan

[21] Appl. No.: 09/101,268

[22] PCT Filed: Mar. 4, 1997

[86] PCT No.: PCT/JP97/00661

§ 371 Date: Jun. 23, 1998

§ 102(e) Date: Jun. 23, 1998

[87] PCT Pub. No.: WO97/33359

PCT Pub. Date: Dec. 9, 1997

[30] Foreign Application Priority Data

Mar. 7, 1996 [JP] Japan .................................... 8-050633
Mar. 28, 1996 [JP] Japan .................................... 8-073725

[51] Int. Cl.[7] .................................................... H02K 5/00
[52] U.S. Cl. ........................... 310/89; 310/71; 310/67 R; 310/68 R; 310/68 B; 310/68 F; 310/68 E; 310/68 C; 310/68 A; 310/75 A; 310/43; 310/254
[58] Field of Search ............... 310/89, 71, 67 R, 310/68 R, 68 B, 68 C, 68 A, 43, 254

[56] References Cited

U.S. PATENT DOCUMENTS

| | | | |
|---|---|---|---|
| 4,259,603 | 3/1981 | Uchiyama et al. | 310/68 B |
| 4,633,110 | 12/1986 | Genco et al. | 310/71 |
| 4,668,898 | 5/1987 | Harms et al. | 318/254 |
| 4,673,834 | 6/1987 | Wrobel | 310/71 |
| 4,724,347 | 2/1988 | Reinhdart et al. | 310/68 R |
| 5,049,769 | 9/1991 | Reinhardt et al. | 310/64 |
| 5,663,604 | 9/1997 | Takahashi et al. | 310/91 |
| 5,691,584 | 11/1997 | Toida et al. | 310/67 R |
| 5,705,868 | 1/1998 | Cox et al. | 310/71 |
| 5,841,208 | 11/1998 | Abe | 310/67 R |
| 5,895,994 | 4/1999 | Molnar et al. | 310/251 |

Primary Examiner—Clayton LaBalle
Assistant Examiner—Thanh Lam
Attorney, Agent, or Firm—Kanesaka & Takeuchi

[57] ABSTRACT

The invention relates to a motor which comprises a drive system which has a stator (10) and a rotor (14), and a control system which controls the drive system and has circuit boards (21), (22), both being housed in a casing (2), wherein the casing (2) has a first conductive pin (25) for flowing a current to input power to the control system and a second conductive pin (26) for flowing a current to output from the control system to respective phases of a coil, and the circuit boards are supported by the first and second conductive pins. And, the invention relates to a method of manufacturing a motor which comprises the steps of using a first die (101) and a second die (102) which are mutually connected with a die split face (104) therebetween and a third die (103) which is inserted in the middle of the first and second dies, inserting and fixing a motor stator, a metallic cylinder and embedding members into a cavity formed by the first, second and third dies, and pouring a molten resin to effect resin molding.

22 Claims, 21 Drawing Sheets

MOTOR AND METHOD FOR PRODUCING THE SAME

TECHNICAL FIELD

The invention relates to a motor, which is used as a drive source for a device provided with an electric motor for an electric scooter, an electric vehicle or the like, and also a method of manufacturing it.

BACKGROUND ART

Vehicles such as electric scooters and electric vehicles not having an internal combustion engine are being developed in these years. A motor as the drive source for such vehicles is housed in a metallic casing to protect its interior.

This casing is formed of a case and a cover both made of metal such as aluminum. After placing the component parts of the motor in the case, the cover is mounted, and the case and the cover are assembled by means of bolts. In this case, a control system for controlling to drive the motor is formed on the exterior of the casing.

Since the motor configured as described above generally has the control system on the exterior of the casing, there are drawbacks as described below.

For example, when the motor is mounted on a scooter body, the motor and the control system must be mounted separately. Besides, they have to be connected mutually with cables accurately, and this wiring work is very troublesome.

Besides, since the motor and the control system must be mounted separately, it is necessary to provide a space for the motor, a space for the control system, and a space for the cables to connect them.

Especially, since the control system has a heating element, a radiating part is needed for the control system in addition to a radiating part (heat sink) for the motor. Therefore, a large space is required therefor.

In addition, the cables connecting the motor with the control system are readily damaged when they are fitted to the scooter body or when the scooter is running.

On the other hand, the motor may be entirely molded with resin instead of a metallic assembling casing to have the molded resin as the casing. But, there are disadvantages that radiation is poor because of the resin, and a mechanical strength is degraded.

In view of the above, the invention is to provide a compact and reliable motor, which is assembled and mounted with ease and also a method of manufacturing it.

SUMMARY OF THE INVENTION

The invention relates to a motor, which comprises a drive system which has a stator and a rotor, and a control system which controls the drive system and has circuit boards, both being housed in a casing, wherein the casing has a first conductive pin for flowing an input current to the control system and a second conductive pin for flowing an output current from the control system to respective phases of a coil, and the circuit boards are supported by the first and second conductive pins.

Therefore, the number of parts is reduced and the mounting space is small according to the invention as compared with a case where the members for fixing the circuit boards and the cables for electrically connecting the power source and the control system are used. Accordingly, the motor can be made compact. Besides, since the parts are stacked and fixed from one direction, assembling can be made automatically, and assembling itself is facilitated.

And, the invention relates to a motor, which comprises a drive system which has a stator and a rotor, and a control system which controls the drive system and has circuit boards, both being housed into a casing, wherein the control system has a board and a plurality of switching elements which are arranged in the form of a ring and mounted on the board.

Therefore, the plurality of switching elements can be mounted on a small area, so that the circuit board can be made small, the control system can be made small without increasing a surge voltage, and the motor can be made compact as a result.

Besides, the invention relates to a method of manufacturing a motor, which comprises the steps of using a first die and a second die which are mutually connected with a die split face therebetween and using a third die which is inserted in the middle of the first and second dies, inserting and fixing a motor stator, a metallic cylinder and members to the embedded into a cavity formed by the first, second and third dies, and pouring a molten resin to effect resin molding.

Since the invention can securely embedding the motor stator and the like at locations determined in the die, accuracy of assembling the pins, circuit boards and other parts in such embedding parts can be improved. Besides, since the metallic cylinder is provided, the positions such as mounting positions requiring the strength can be served by this cylinder. For example, wiring for the motor driving and sensor is made on the embedded members and molding is made to make the connectors, so that the die split face is not required to be formed at a position where the wiring is pulled out. Therefore, the molding die is not required to be split in a complicated shape, and the cost reduction can be made.

BEST MODE FOR CARRYING OUT THE INVENTION

Figure 1:
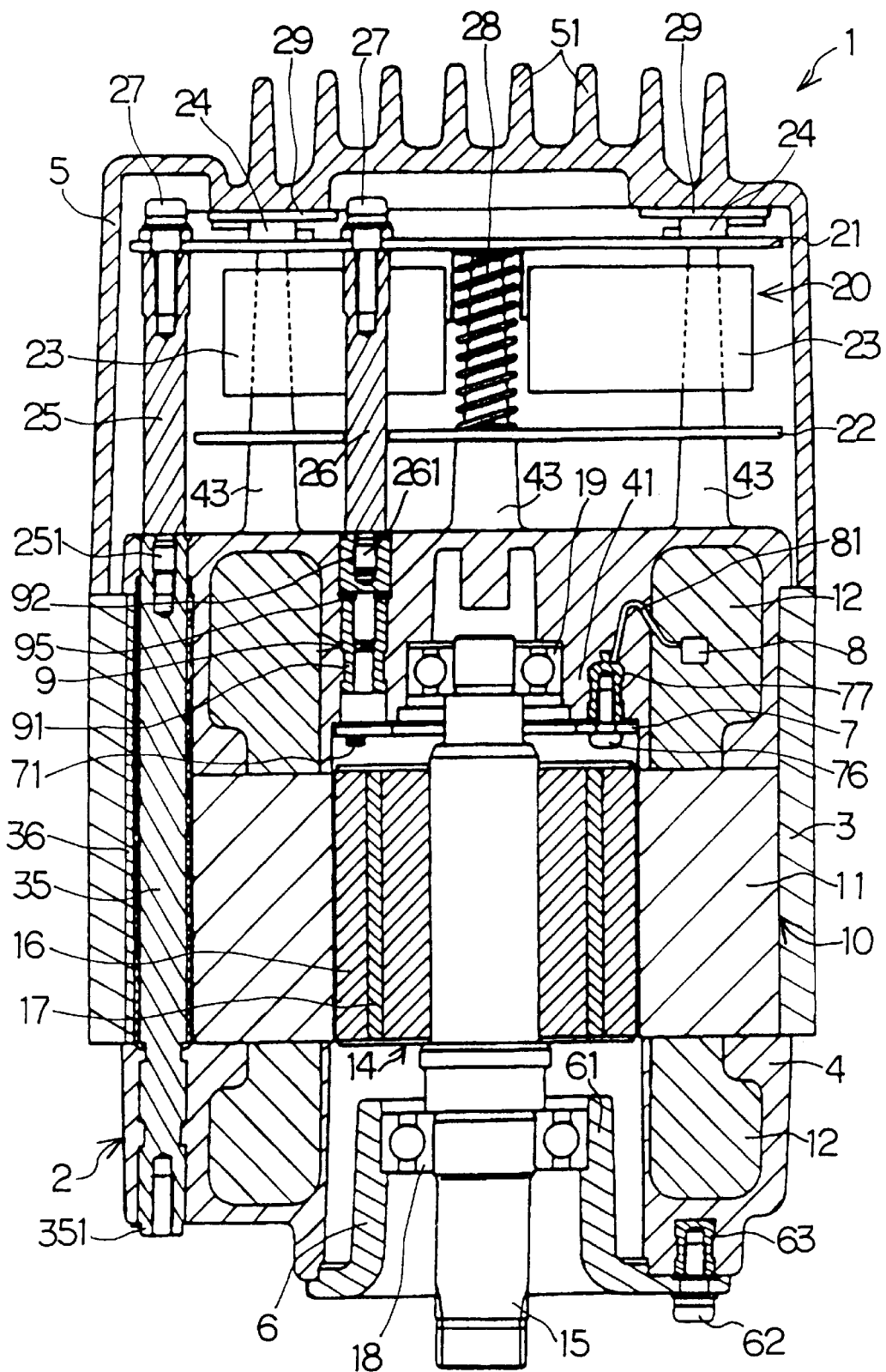
FIG. 1 is a sectional side view showing an embodiment of applying the motor of the invention to an electric scooter motor.

The motor and its manufacturing method of the invention will be described in detail with reference to preferred embodiments shown in the accompanying drawings. For convenience of description, in FIGS. 1, 18, 20 and 24, the lower position is referred to as "base end", the upper side as "leading end", and the vertical direction as "axial direction".

As shown in FIG. 1 through FIG. 6, a motor 1 of this embodiment is a brushless DC motor and configured by housing a motor consisting of a stator 10 and a rotor 14 and a control system 20 for controlling to drive the motor into a casing 2.

In this embodiment, a coil (exciting coil) 12 of the stator 10 is a three-phase coil formed of a U phase (a first phase), a V phase (a second phase) and a W phase (a third phase).

The casing 2 mainly comprises a metallic cylinder 3 fitted to the outer periphery of the stator 10 to be described afterward, a resin mold 4, a metallic cover 5 connected to the leading end of the cylinder 3, and a lid member 6 mounted on the base end of the resin mold 4. The resin mold 4 is formed by molding the cylinder 3 and the stator 10 with a resin. In this case, most of the stator 10 is embedded in the resin mold 3, the leading end and base end of the cylinder 3 are engaged with the resin mold 4 so as to be fixed to the resin mold 4.

The resin for forming the resin mold 4 may be a thermoplastic resin or a thermosetting resin. Examples of such a resin include rigid resins such as polyester-based resins, phenol-based resins and urea resins. It is preferable that they having a linear expansion coefficient lower than that of the metal configuring the cylinder 3, or closer to that of the metal configuring a core 11, excelling in absorption of vibrations and noise, and excelling in molding property, or having satisfactory strength and durability. In view of these points, polyester-based resins are particularly preferable.

Figure 4:
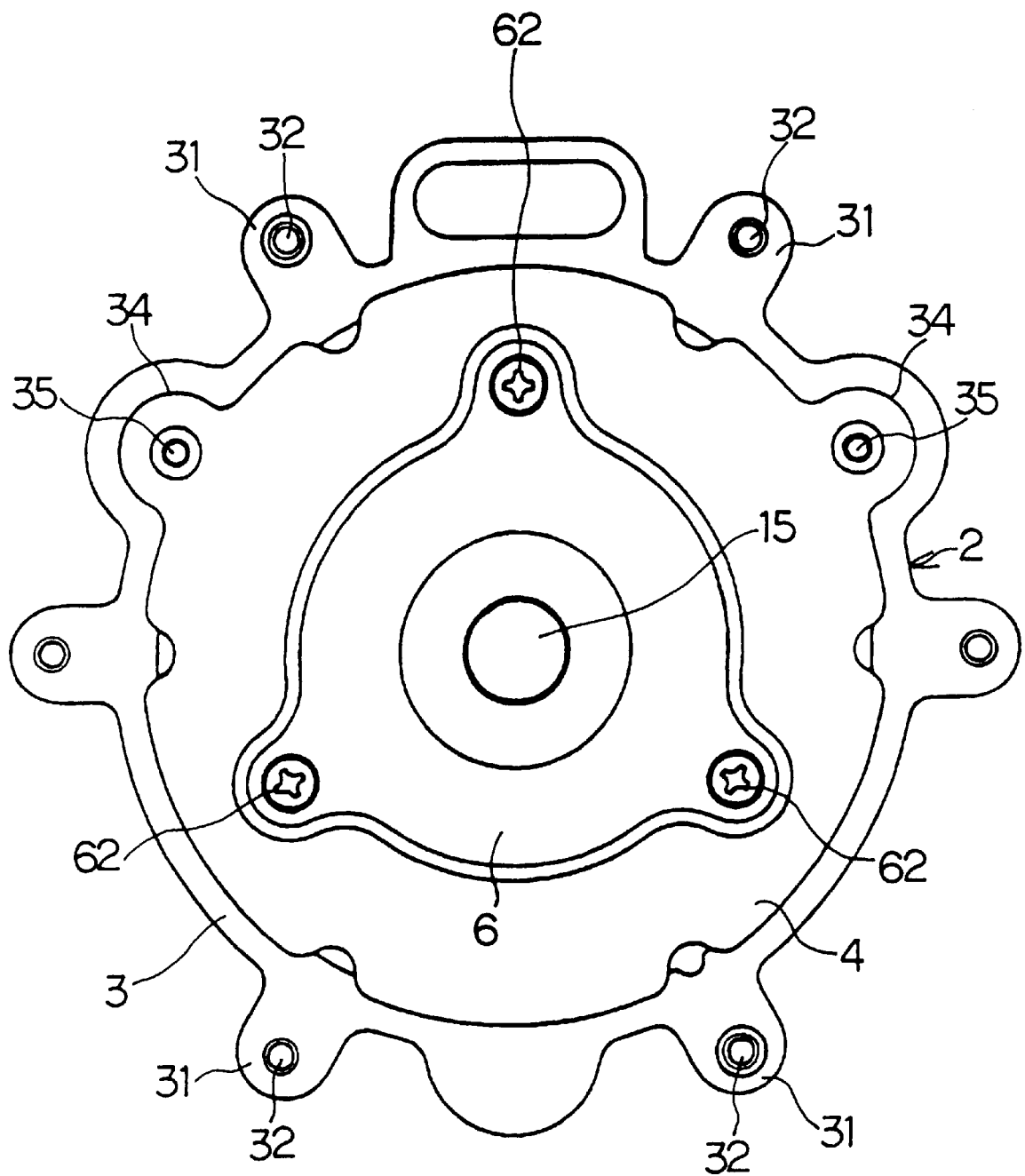
FIG. 4 is a bottom view of the motor shown in FIG. 1.
Figure 5:
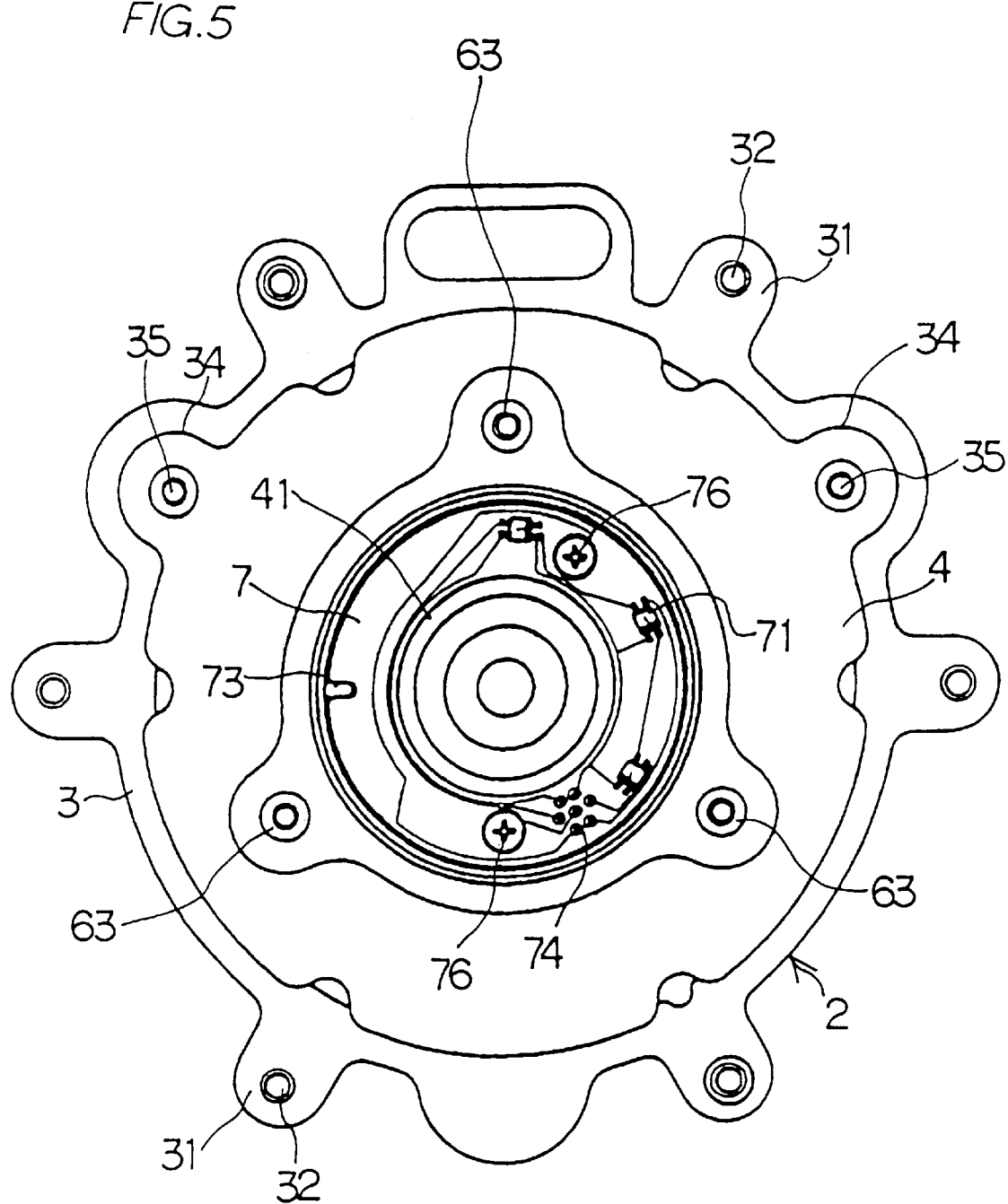
FIG. 5 is a bottom view of the motor in a state with its lid member and rotor removed.
Figure 6:
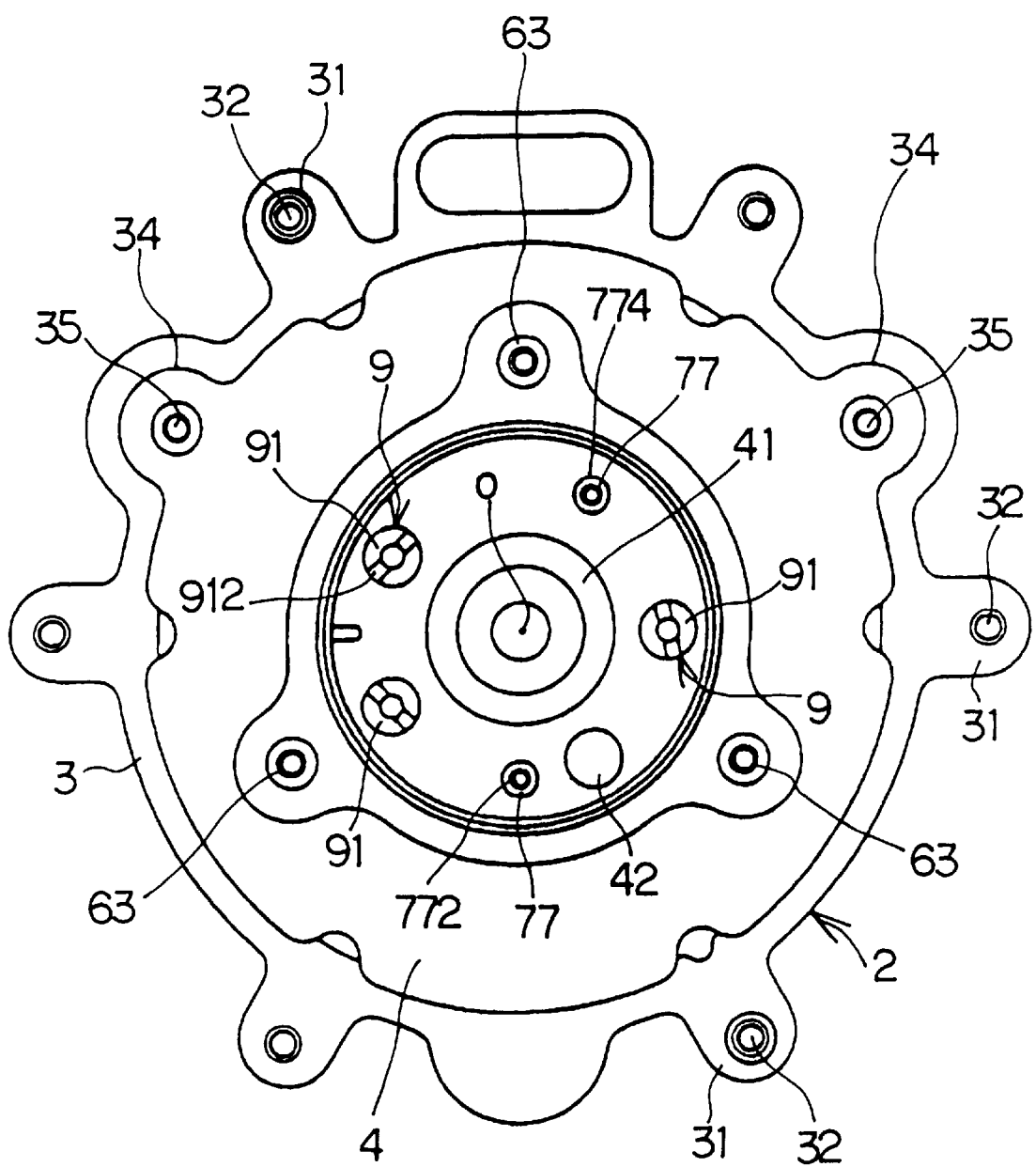
FIG. 6 is a bottom view of the motor in a state with its lid member, rotor and circuit board removed.

On the outer periphery of the cylinder 3 there are formed a plurality (six in the drawing) of ribs 31 extending in the axial direction. As shown in FIG. 4 through FIG. 6, the base end of each rib 31 forms a mount for fixing the brushless DC motor 1 to a scooter body. Specifically, a tapped hole 32 is formed on the base end of each rib 31, in which an unillustrated bolt (screw member) is threaded in order to mount the brushless DC motor 1 to the scooter body (not shown). The brushless DC motor 1 is mounted on the scooter body through the mount formed on the metallic cylinder 3 having a high mechanical strength, so that a mounting strength is high, and the casing 2 is not damaged.

Figure 2:
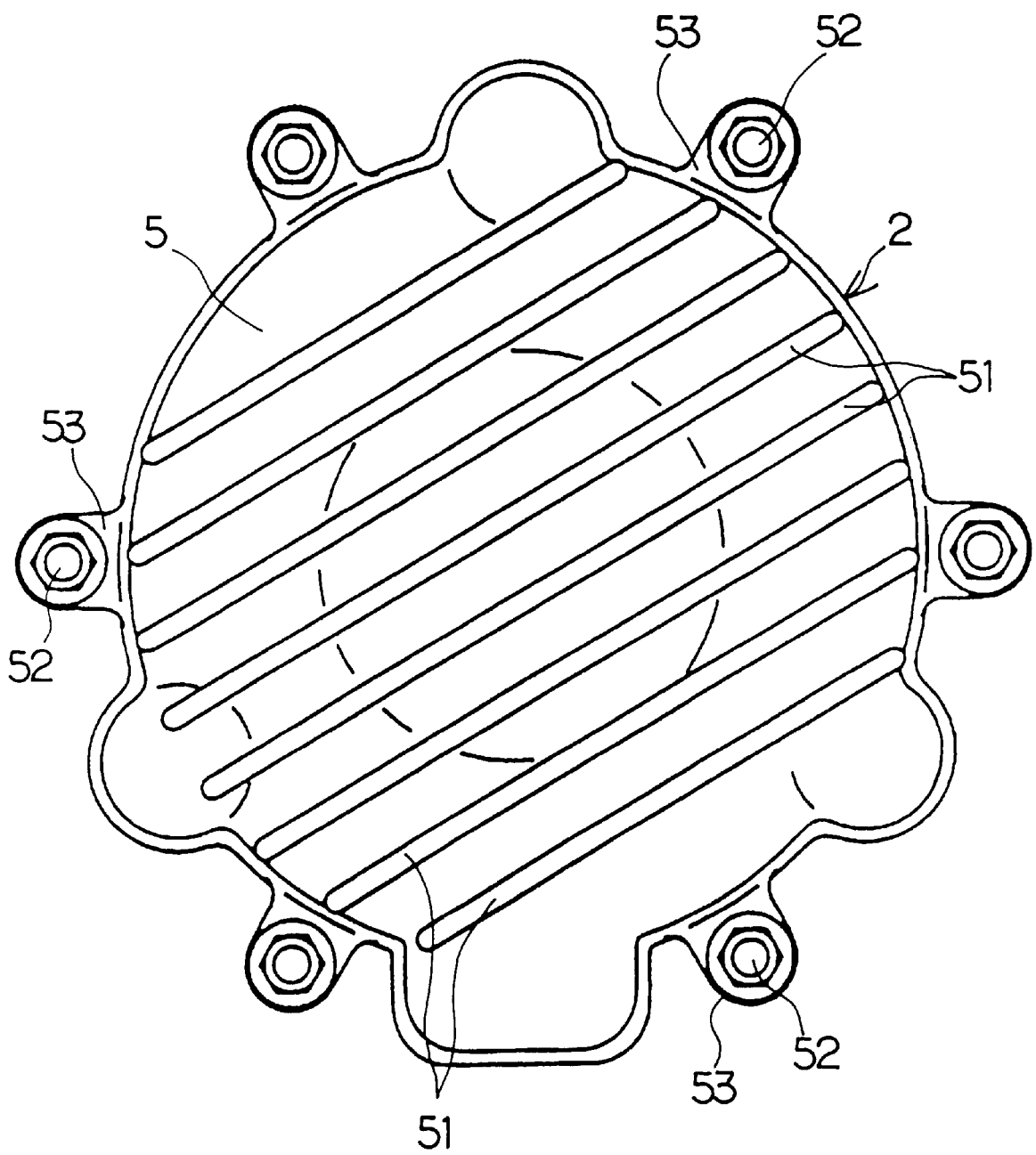
FIG. 2 is a plan view of the motor shown in FIG. 1.
Figure 3:
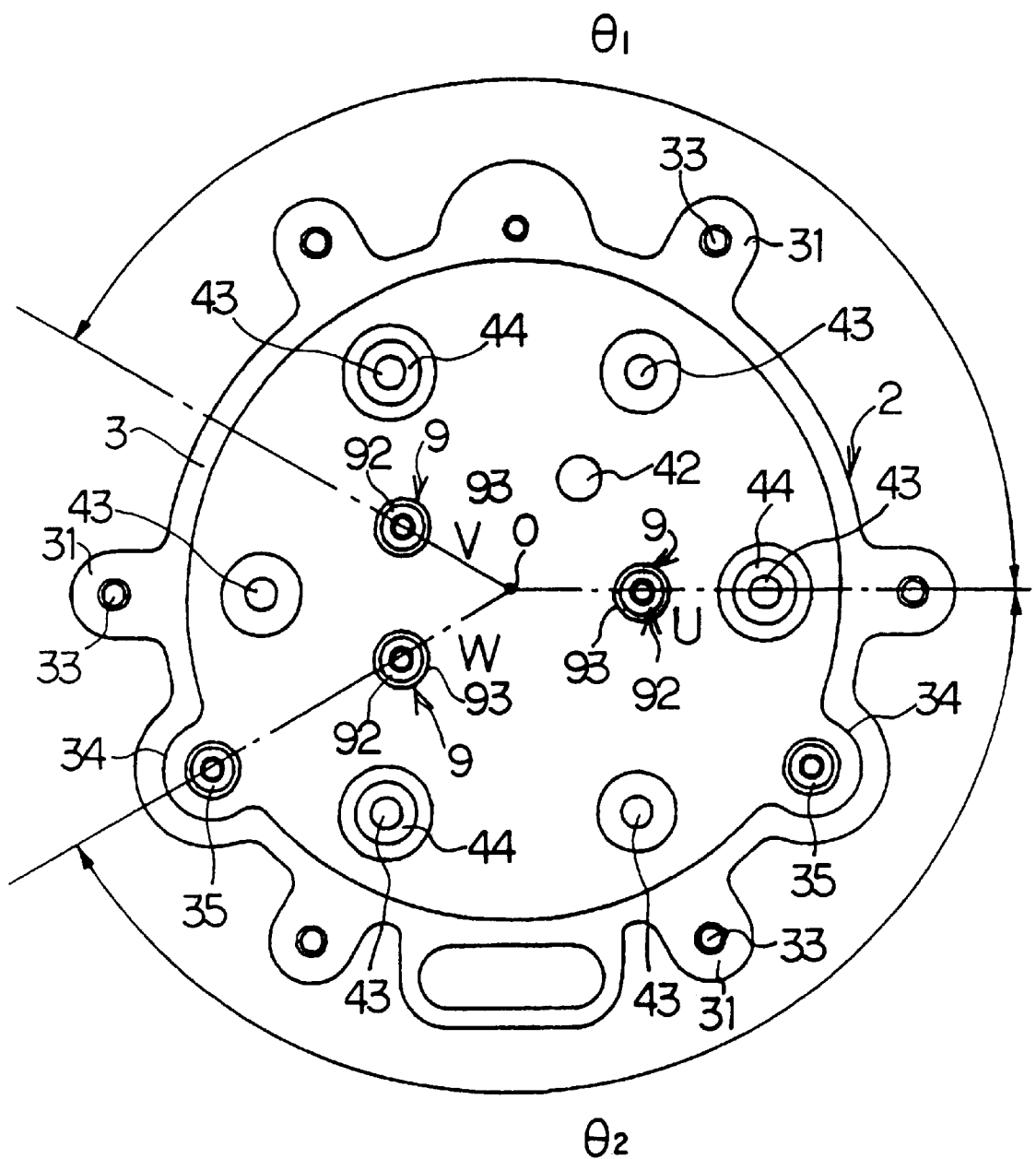
FIG. 3 is a plan view of the motor in a state with its cover and control system removed.

Besides, a tapped hole 33 is formed on the leading end of each rib 31 as shown in FIG. 3. A bolt (screw member) 52 is tightened into the tapped hole 33 to connect and fix the cover 5 to the cylinder 3. And, as shown in FIG. 2, the bolts 52 are inserted into flanges 53 formed on the outer periphery of the cover 5, and the respective bolts 52 are threaded into the tapped holes 33 to connect and fix the cylinder 3 with the cover 5.

And, a pair of grooves 34 is formed to extend in the axial direction on the inner wall of the cylinder 3. A conductive rod (primary terminal) 35 is inserted through the grooves 34 to pass through the cylinder 3 from its base end to the leading end and molded with the resin.

This pair of conductive rods 35 serve as the primary terminal for flowing a current to the coil 12 of the stator 10 to be described afterward, namely a route for supplying power from a power source (not shown) to the control system 20 to be described afterward. And, they are disposed to protrude from the base end of the cylinder 3 further toward the base end, and the base ends of the conductive rods 35 are exposed to the surface of the resin mold 4. In this case, the base ends of the conductive rods 35, namely the ends of the conductive rods 35 on the same side as the protruded end of a rotating shaft 15, have a terminal (connection terminal) 351 formed to be connected with the power source.

As described above, the brushless DC motor 1 of this embodiment is disposed to supply the power from the power source to the control system 20 through the conductive rods 35. Therefore, comparing with the structure having a cable to supply the power from the power source to the control system 20, assembling is easy, and the power supply route can be prevented from being damaged or the cable is broken due to vibrations or the like. Furthermore, a power loss is small as compared with the case of forming the power supply route by the cable.

And, since the terminal 351 of the conductive rod 35 is provided on the same side as the protruded end of the rotating shaft 15, wiring from the power source to the terminal 351 can be made inside the scooter body (inside a CVT casing). Therefore, the wiring is not exposed outside, and reliability of the wiring from not being damaged is improved.

The brushless DC motor 1 does not need a separate terminal stand between an output of the power source and an input of the control system 20 in order to electrically connect the power source with the control system 20. Accordingly, the brushless DC motor 1 can be made compact in size.

An insulating layer 36 is formed between the cylinder 3 and the conductive rod 35 to insulate the cylinder 3 from the conductive rod 35. This insulating layer 36 may be formed of a resin mold.

The cylinder 3 is made of a metallic material such as aluminum or aluminum alloy, copper or copper alloy, or stainless steel. If the cylinder 3 is made of aluminum or aluminum alloy, the cylinder 3 has a linear expansion coefficient larger than those of the resin and the core 11. Therefore, when the resin molding is made with a die temperature raised as described afterward, a gap is formed between the cylinder 3 and the core 11, and the molten resin enters the gap. When the completed casing 2 is cooled, the cylinder 3 tends to contract, but because of the resin, it does not contract thoroughly, and a contact pressure between the cylinder 3 and the resin mold 4 increases. As a result, the cylinder 3 is preferably made of aluminum or aluminum alloy in view of the point that the cylinder 3 is firmly fixed to the resin mold 4.

And, the conductive rods 35 and pins 25, 26 to be described afterward are made of copper or copper alloy and preferably made of oxygen-free copper in view of the improvement of the motor efficiency.

As described above, since the cylinder 3 is made of a metallic material, the resin mold 4 can be reinforced; the casing 2 as a whole can have a sufficient strength and excels in heat conduction and radiation. Since the radiation is good, degauss of magnets due to the temperature increase in the motor is prevented, so that the motor can be kept to have high performance.

Heat resulting from the driving of the motor is transmitted to the cylinder 3 by the stator 10 and partly radiated to the atmosphere, and the remainder is transmitted to the cover 5. The cover 5 is placed to cover the control system 20 to be described afterward. And, this cover 5 has a plurality of radiating fins 51 on its leading end, and the heat transmitted to the cover 5 is radiated to the atmosphere through the radiating fins 51.

These radiating fins 51 increase the surface area of the casing 2, improve further radiation, and can cool the motor and the casing 2 efficiently. Especially, when the scooter is running, airflow comes in contact with the surfaces of the radiating fins 51 to make air-cooling.

In this embodiment, a sufficient motor cooling effect can be obtained by simply forming the radiating fins 51 on the cover 5. But, if the cooling effect is not enough, the same fins may also be formed on the cylinder 3.

As described above, this brushless DC motor 1 has the cover 5 which also serves as a radiating part (heat sink), so that the number of parts can be decreased as compared with the case of forming the cover and the radiating part by separate members, thereby facilitating the manufacturing.

And, this radiating part also serves as the radiating part of the control system 20 as described afterward. Specifically, in this embodiment, since the radiating part of the motor and the radiating part of the control system 20 are common, the brushless DC motor 1 can be made compact.

If the resin mold 4 is exposed to the surface, its environment resistance such as water resistance, oil resistance and UV resistance is significant. But, since the brushless DC motor 1 of this embodiment has the cylinder 3 and the cover 5 which are made of a metallic material, when it is mounted on the scooter body with the base end of the ribs 31 of the cylinder 3, the outer periphery is completely covered with the metallic material. When the metallic material for covering the outer periphery is one which is already accepted as a material for a mobile, such as an aluminum die-casting, ADC 12, an issue of the environment resistance can be remedied.

A space surrounded by the cover 5 accommodates the control system 20 for controlling to drive the motor. Now, a first structure of the control system 20 will be described.

The control system 20 mainly comprises a disk circuit board (a first circuit board) 21 and a circuit board (a second circuit board) 22 which are disposed to face with each other, two electrolytic capacitors 23 disposed on the base end of the circuit board 21, six switching elements (power elements) 24 disposed on the leading end of the circuit board 21 to configure an inverter circuit, an unillustrated inverter control circuit (mounted on the circuit board 21 or the circuit board 22) for controlling to drive the inverter circuit, and an unillustrated power circuit (mounted on the circuit board 21 or the circuit board 22).

In this embodiment, one unit of the switching elements 24 is made of three MOSFETs, and according to a predetermined electrifying pattern, the inverter control circuit turns on the switching element 24 on the plus side and the switching element 24 on the minus side (including PWM control) among the six switching elements, thereby successively flowing a current through two phases among the U, V and W phases (making bipolar drive of the three phases). Thus, a rotating magnetic field is formed on the stator 10 to rotate the rotor 14.

Figure 7:
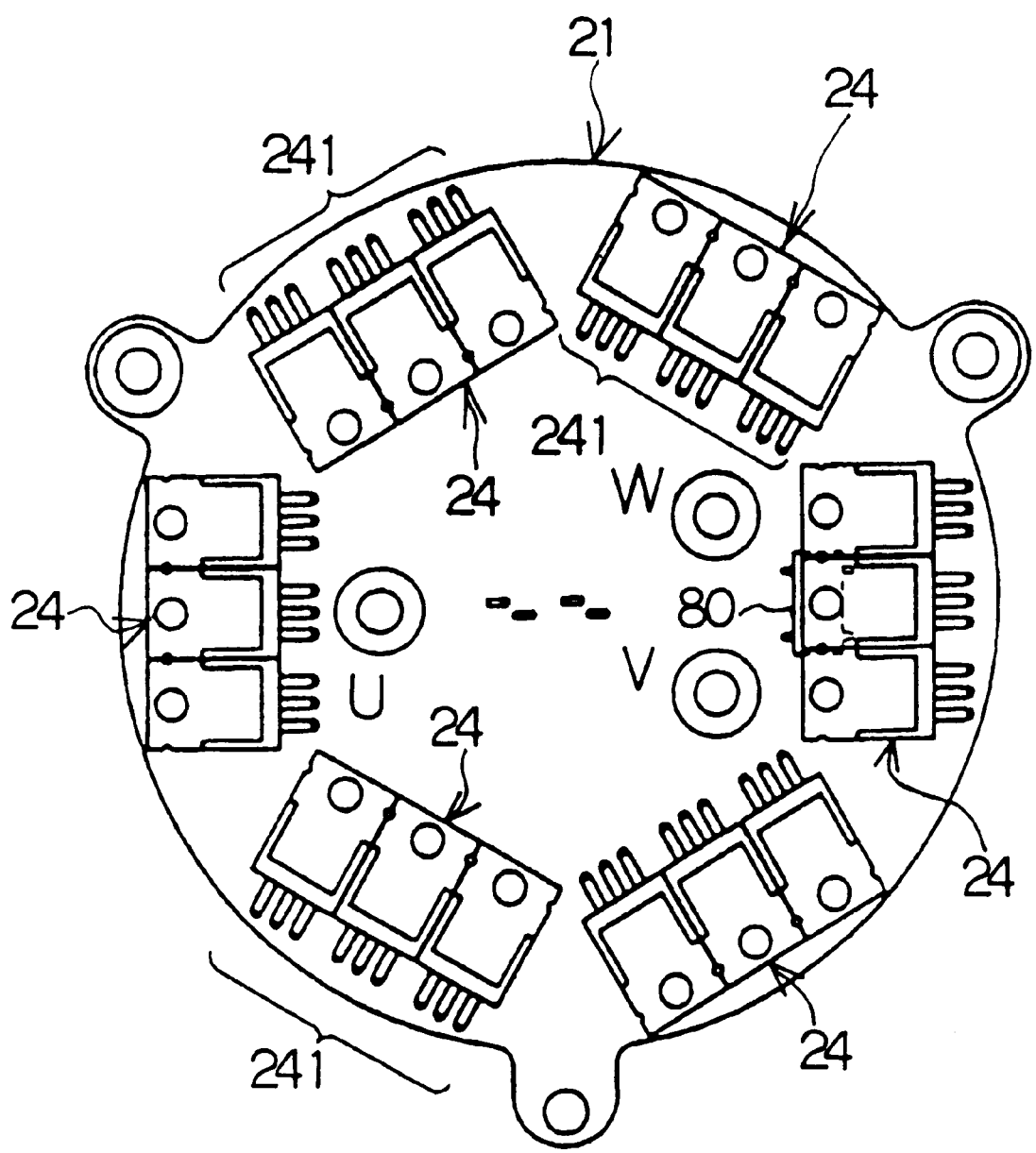
FIG. 7 is a plan view showing a circuit board (first circuit board) and a switching element mounted on the circuit board.

The respective switching elements 24 in FIG. 7 are mounted on the outer periphery at the leading end of the circuit board 21. And, they are arranged in the form of a hexagonal ring (substantially circumferential).

The respective switching elements 24 have a terminal group (arm section) 241 protruded to one end, and the terminal groups 241 are arranged to alternately directed to the inner and outer peripheries. Specifically, the switching elements 24 having the terminal groups 241 directed to the inner periphery and those having the terminal groups 241 directed to the outer periphery are alternately positioned.

And, a temperature sensor (thermistor) 80 for detecting a temperature of the switching element 24 is disposed between one of the six switching elements 24 and the circuit board 21.

As described above, since the brushless DC motor 1 has the switching elements 24 placed in the hexagonal ring form, respective leads on the circuit board 21 related to the U, V and W phases can have substantially the same length, and a surge voltage can be reduced accordingly.

And, since the respective switching elements 24 have their terminal groups 241 directed to the inner and outer peripheries alternately, they can be moved toward the inner periphery while keeping an insulated state without having a radiating plate being contacted with the neighboring switching elements 24. In other words, the switching elements 24 can be placed in a small space, so that the circuit board 21 can be made small. Therefore, the control system 20 can be made small without increasing the surge voltage, and therefore the brushless DC motor 1 can be made compact.

And, a temperature of a heating element, namely the switching element 24, can be detected by the temperature sensor 80. Since the temperature of the switching element 24 is directly detected, accuracy of detecting the temperature can be improved.

By controlling the drive of the motor based on a detected value provided by the temperature sensor 80, the switching elements 24 are prevented from having an increased temperature. Accordingly, the brushless DC motor 1 is improved in reliability.

Besides, as shown in FIG. 1, a radiating sheet 29 is disposed on the top face (leading end face) of each switching element 24, namely between the top face of each switching element 24 and the inner face of the leading end of the cover 5, in order to cover the whole or part of the top face of the switching element 24.

This radiating sheet 29 is made of a material having a high heat conductivity, and also insulation properties and elasticity. Therefore, heat from the switching elements 24 is surely transmitted to the cover 5 by the radiating sheet 29 to improve a cooling efficiency. And, the switching elements 24 and the cover 5 are insulated, and the switching elements 24 can be prevented from being damaged due to vibrations.

The radiating sheet 29 is made of a material including silicate such as silicone, mica, clay, or talc; polyethylene terephthalate (e.g., Myra (product name)), and other various types of polyesters.

The radiating sheet 29 has a thickness of about 0.2 to 1.0 mm, and preferably about 0.4 to 0.8 mm. When the radiating sheet 29 has a thickness falling in the above ranges, an assembling tolerance in the axial direction, which is produced in assembling the circuit board 21 to the pins 25, 26 to be described afterward, is absorbed by the elasticity of the radiating sheet 29, and the switching elements 24 can be in pressure contact with the cover 5 without fail. Therefore, heat produced by the switching elements 24 is transmitted to the cover 5, the switching elements 24 are insulated from the cover 5 without fail, and the switching elements 24 can be prevented more securely from being damaged due to vibrations and the like.

Now, a second structure of the control system 20 will be described. The same part of the second structure with the first structure of the control system 20 will be omitted from the description, and differences will be described mainly.

As shown in FIG. 1, the control system 20 mainly comprises a disk circuit board (a first circuit board) 21 and a disk circuit board (a second circuit board) 22 which are disposed to face with each other, two electrolytic capacitors 23 disposed on the base end of the circuit board 21, a stationary member 30 (see FIG. 13), six switching elements (power elements) 24 disposed on the leading end of the circuit board 21 with the stationary member 30 therebetween to configure an inverter circuit, an unillustrated inverter control circuit (mounted on the circuit board 21 or 22) for controlling to drive the inverter circuit, and an unillustrated power circuit (mounted on the circuit board 21 or 22).

As shown in FIG. 9 through FIG. 14, the stationary member 30 as a whole has a substantially regular hexagonal ring.

A step 302 for positioning of the switching element 24 is formed on each of six sides 301 of the stationary member 30, and a through-hole 304, in which a screw member 311 for fixing the stationary member 30 is inserted, is formed on each of six corners 303.

One of these sides 301 has on its inner periphery a mount 305 for mounting thereon the temperature sensor (thermistor) 80, which detects a temperature of the switching element 24.

Figure 10:
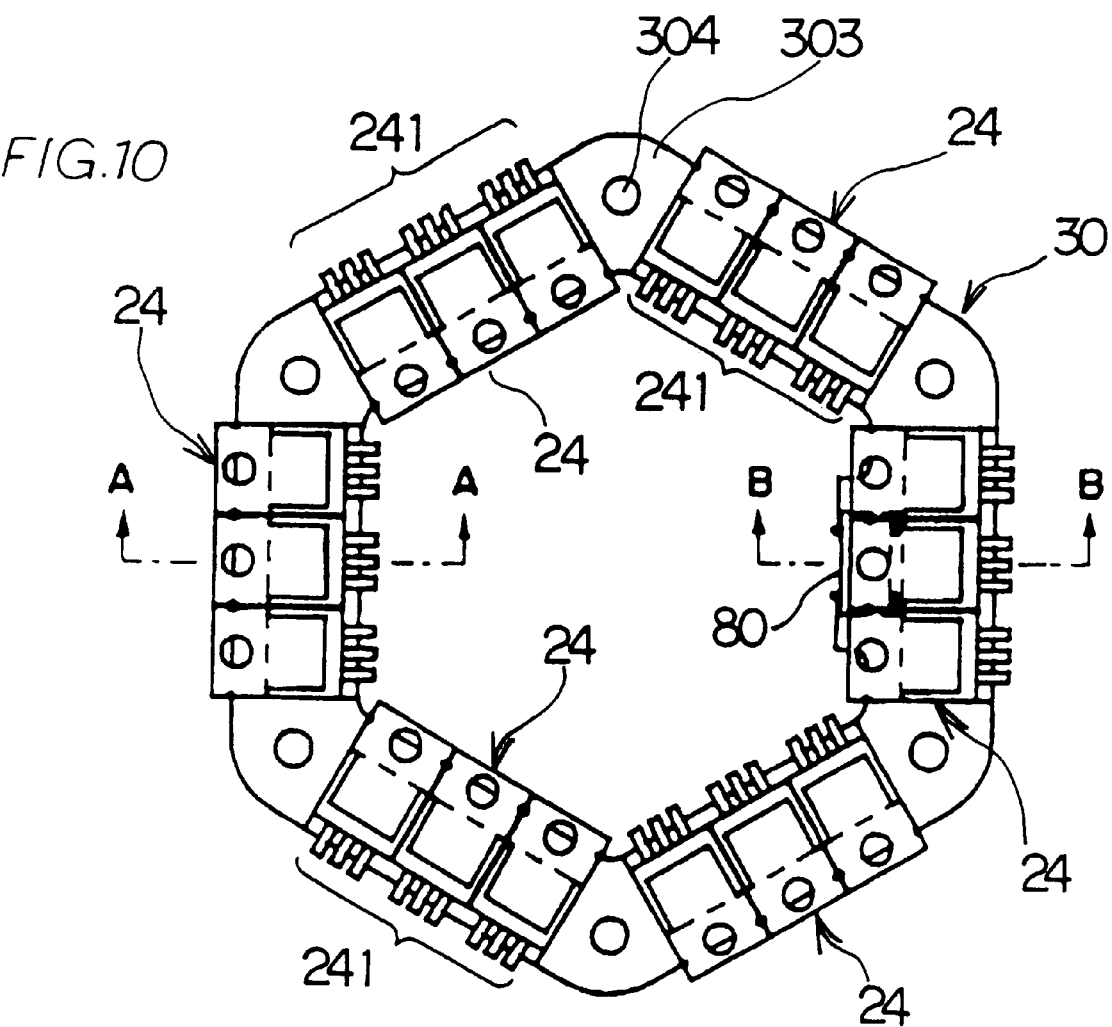
FIG. 10 is a plan view showing a state that switching elements are mounted on the fixing member shown in FIG. 9.
Figure 11:
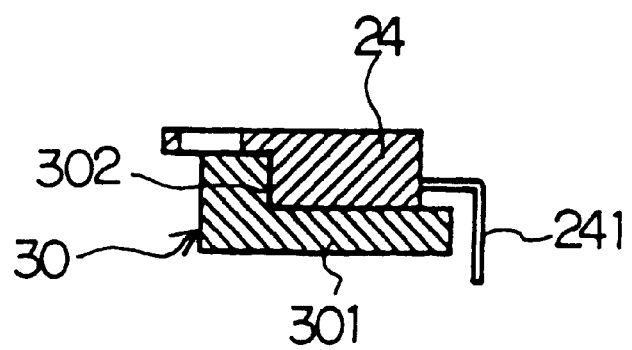
FIG. 11 is a sectional view taken along line A—A of FIG. 10.
Figure 12:
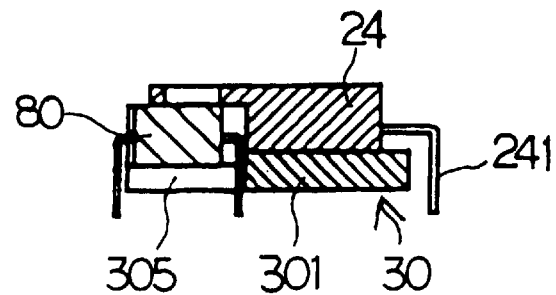
FIG. 12 is a sectional view taken along line B—B of FIG. 10.

As shown in FIGS. 10, 11 and 12, the temperature sensor 80 is mounted on the mount 305 of the stationary member 30, and the switching element 24 is placed on the respective sides 301. Accordingly, the switching elements 24 are mounted in the form of a hexagonal ring (substantially circumferential).

The switching elements 24 have the terminal groups 241 directed to the inner and outer peripheries alternately. In other words, the switching elements 24 having the terminal groups 241 directed to the inner periphery and those having the terminal groups 241 directed to the outer periphery are alternately positioned.

Figure 13:
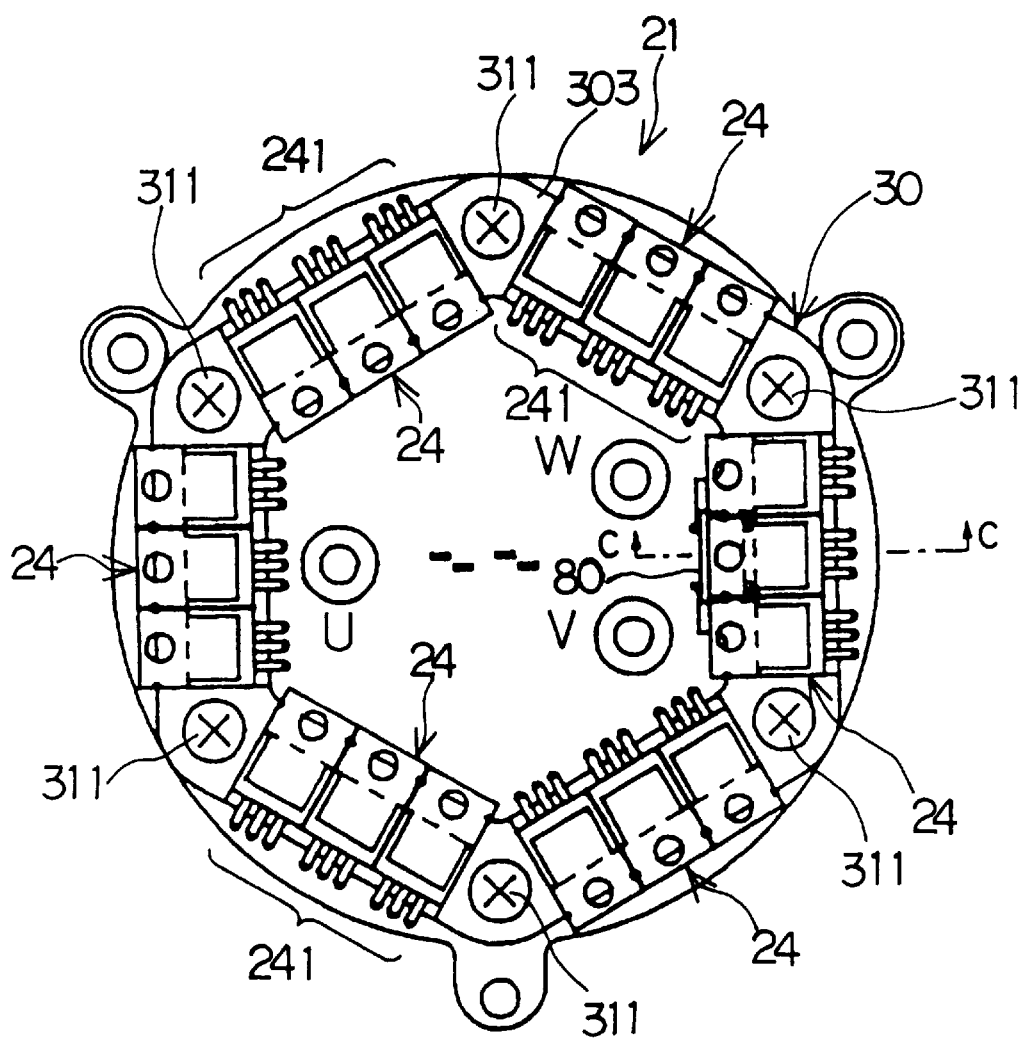
FIG. 13 is a plan view showing a state that the fixing member shown in FIG. 10 is mounted on the circuit board (first circuit board).
Figure 14:
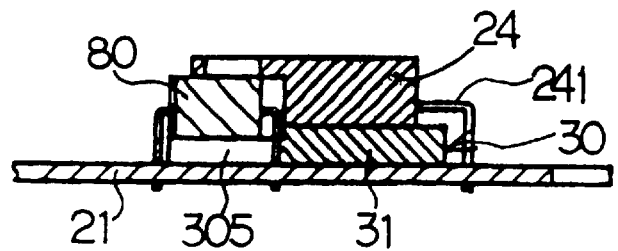
FIG. 14 is a sectional view taken along line C—C of FIG. 13.

As shown in FIG. 13 and FIG. 14, the stationary member 30 is fixed to the outer periphery at the leading end of the circuit board 21 by the screw members 311. The respective switching elements 24 are mounted on the outer periphery of the circuit board 21 with the stationary member 30 between them.

As described above, in the second structure of the control system 20, the surge voltage is decreased, and the brushless DC motor 1 can be made compact and improved in reliability in the same way as the first structure of the control system 20.

And, in the second structure, the respective switching elements 24 are mounted in place as a whole on the circuit board 21 by the stationary member 30, so that assembling wok can be improved. And, as compared with a case where the respective switching elements are individually fixed to the heat sink by screws and the terminal groups of the switching elements are connected to the circuit on the circuit board with leads, wiring can be made simple and wiring costs can be reduced, and a cooling efficiency (radiating effect) can be improved because no tapped holes are needed on the cover 5.

In the same manner as the first structure of the control system 20, a radiating sheet 29 is disposed on the top face (between the top face of each switching element 24 and the inner face of the leading end of the cover 5) of each switching element 24 in order to cover the whole or part of the top face of the switching element 24.

In the same way as the first structure described above, a cooling efficiency is improved by virtue of the radiating sheet 29. And, the switching elements 24 and the cover 5 are insulated, and the switching elements 24 can be prevented from being damaged due to vibrations.

Since the details of the radiating sheet 29 are the same as the first structure, its description will be omitted.

In this invention, the circuit board 21 may be formed integral with the stationary member 30.

Figure 8:
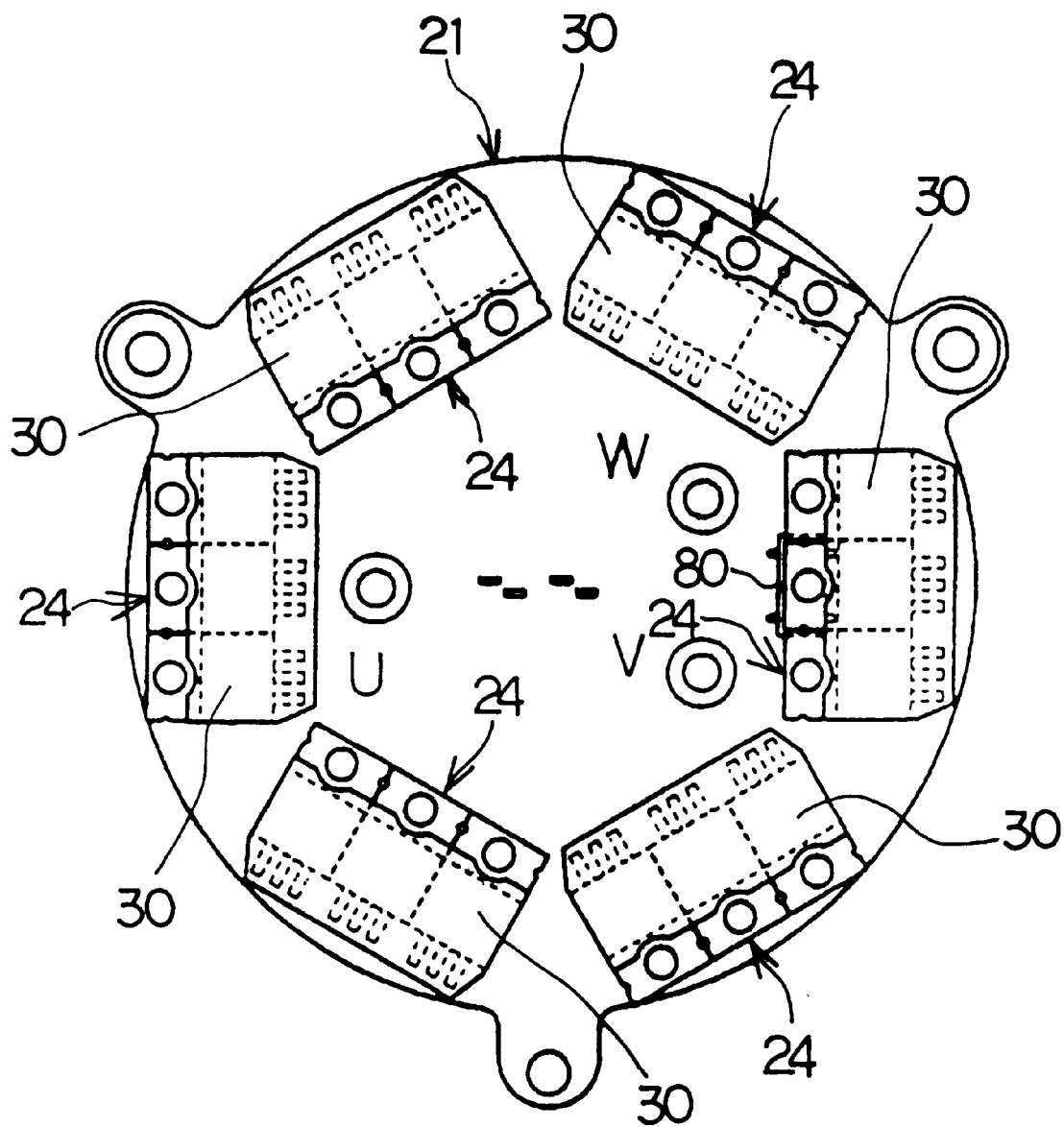
FIG. 8 is a diagram showing a state that fixing members made into a resin mold are mounted on the circuit board.
Figure 9:
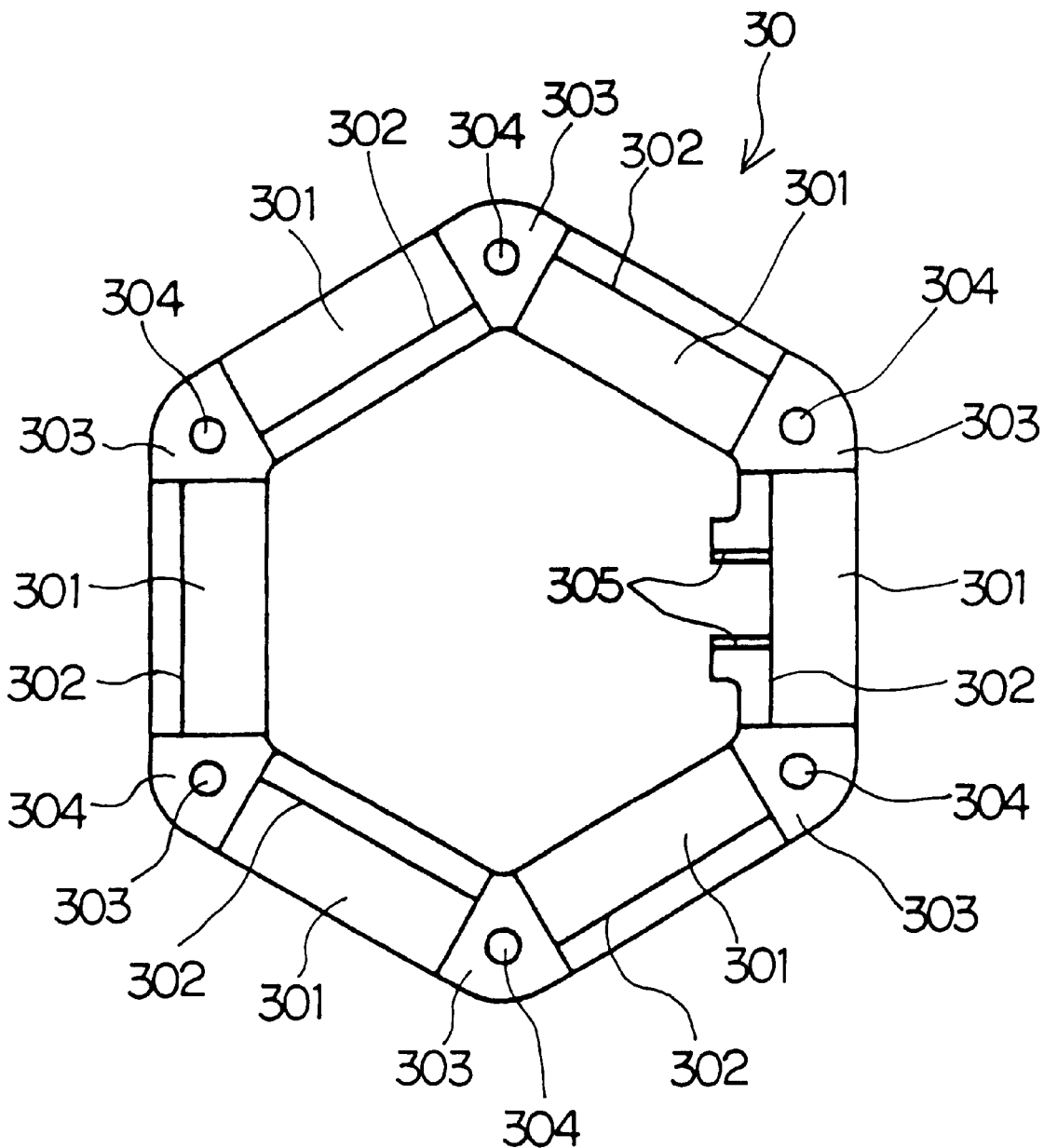
FIG. 9 is a plan view showing a structure of the fixing member.

As shown in FIG. 8, the stationary member 30 may be made of a resin mold having the switching element 24 and the temperature sensor 80 molded with resin. Thus, workability of assembling the brushless DC motor 1 is improved.

Now, a connector will be described.

As shown in FIG. 1 and FIG. 3, connectors (embedded members) 9, namely a connector (first connector) 9U connected with the U phase, a connector (second connector) 9V connected with the V phase and a connector (third connector) 9W connected with the W phase are embedded in the neighborhood of a bearing support 41 (to be described afterward) of the resin mold 4.

These connectors 9U, 9V and 9W are formed substantially on the circumference of the same circle with a rotating center O of the rotor 14 to be described afterward. And, a through-hole 42 to be described afterward is also formed substantially on the circumference of the same circle.

The connectors 9U, 9V and 9W are preferably formed so that a center angle θ1 between the connector 9U and the connector 9V with respect to the rotating center O is 150° and a center angle θ2 between the connector 9U and the connector 9W with respect to the rotating center O is 150°.

The center angles θ1 and θ2 may have an error of ±10° taking deviation in the manufacturing into account.

Figure 15:
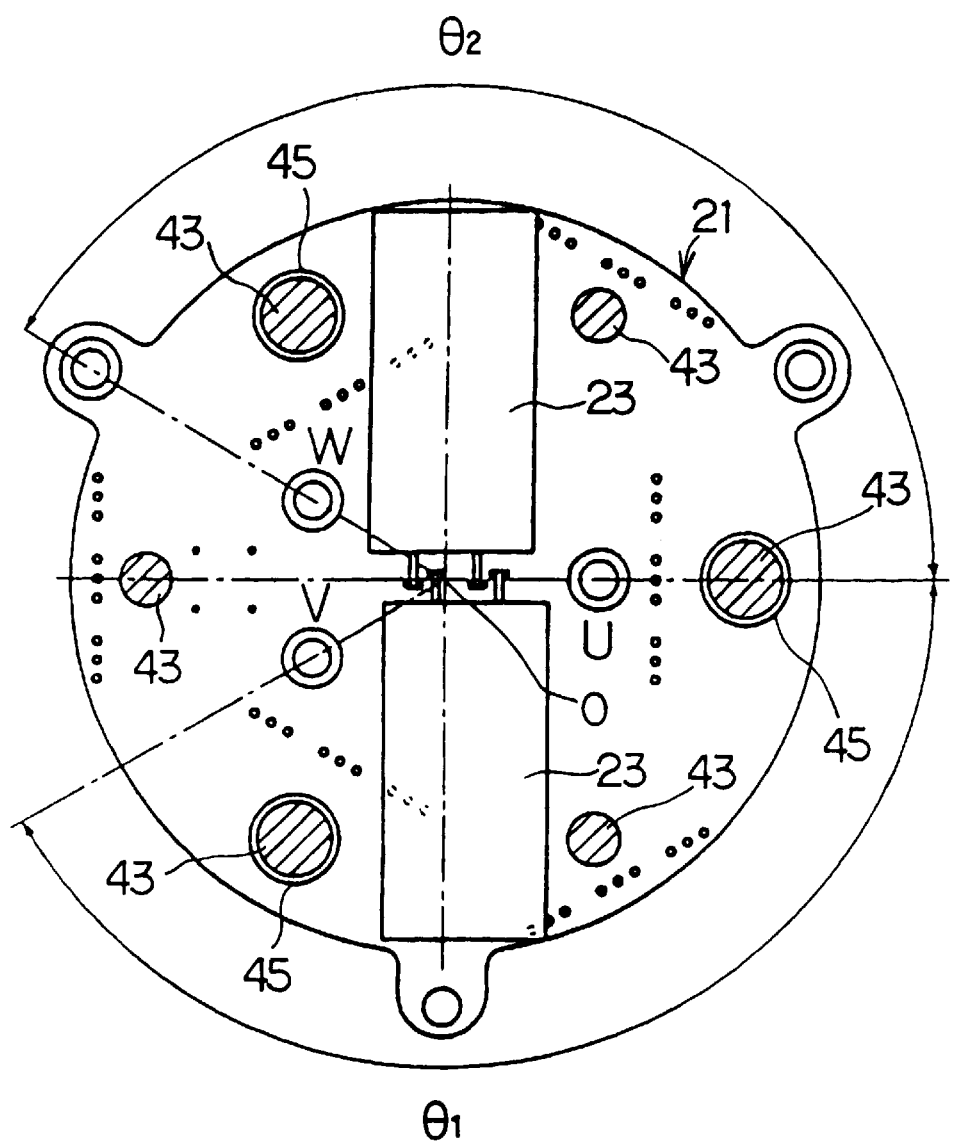
FIG. 15 is a bottom view showing a circuit board (second circuit board).

FIG. 15 is a bottom view showing the circuit board 21. It is seen that two electrolytic capacitors 23 are relatively large cylindrical parts.

Power from a power source (not shown) is temporarily stored in the electrolytic capacitors 23 and then supplied therefrom to the respective switching elements 24. Therefore, when the connectors 9U, 9V and 9W are formed as described above, the electrolytic capacitors 23 are disposed so that the respective terminals are positioned substantially at the center of the circuit board 21 and the respective switching elements 24 are mounted on the outer periphery of the circuit board 21, the wiring between the electrolytic capacitors and the respective switching elements 24 can be made equal and short as much as possible. Thus, the wiring inductance (line inductance) for the respective switching elements 24 is made equal, and the respective wiring inductance can be reduced respectively. By configuring as described above, the surge voltage of each switching element 24 can be lowered.

The two electrolytic capacitors 23 may be arranged in line to have a large capacity, but the connectors 9U, 9V and 9W must be arranged not to overlap with the electrolytic capacitors 23. As described above, the connectors 9U, 9V and 9W are disposed so that the center angles θ1, θ2 each becomes 150°. Then, the connectors 9U, 9V and 9W do not overlap with the electrolytic capacitors 23, and inductance can be given to the respective wiring described above as equal as possible. Accordingly, the control system 20 can be made compact, namely the brushless DC motor 1 can be made compact.

The connectors 9U, 9V and 9W described above are positioned on preferable positions in this embodiment, but their positions are not limited to such preferable positions.

In this invention, the connectors 9U, 9V and 9W are preferably mounted so that, according to various conditions such as the number, size and the like of the electrolytic capacitors 23 mounted on the circuit board 21, the electrolytic capacitors 23 can be disposed with their terminals positioned at substantially the center of the circuit board 21, and the switching elements 24 can be mounted on the outer periphery of the circuit board 21.

For example, if the conditions for the electrolytic capacitors 23 are not limited particularly, the center angles θ1, θ2 are preferably be set to 120°.

And, in this brushless DC motor 1, the electrical connection of the respective switching elements 24 with the connectors 9U, 9V and 9W and fixing of the circuit board 21 are effected by means of the conductive pins 26 to be described afterward and fixed to the connectors 9U, 9V and 9W.

The structures of the connectors 9U, 9V and 9W will be described in detail afterward with reference to a typical single phase.

In this embodiment as shown in FIG. 1 and FIG. 3, six support posts 43 are erected (one-piece molding) to serve as pushing means to extend in the axial direction from the top face of the resin mold 4.

The respective support posts 43 are formed to correspond with the respective switching elements 24 described above. Specifically, the support posts 43 are formed at intervals of the same angle on substantially the circumference of the same circle having the rotating center O as the center on the outer circumference of the connectors 9U, 9V and 9W.

And, three of the six support posts 43 have a step (engaging part) 44 at the middle portion to engage with the circuit board 21. The support posts 43 having the steps 44 and the support posts 43 without the steps 44 are alternately formed. The support posts 43 having the steps 44 correspond to the projections having the engaging part to engage with the second circuit board 22 in the invention.

The conductive rods 35 described above are positioned on the outer periphery of the support posts 43 and on substantially the circumference of the same circle with the rotating center O as the center.

As shown in FIG. 1, the conductive pin (first conductive pin) 25 and the conductive pin (second conductive pin) 26 are firmly connected by tightening screw members 251, 261 to the leading ends of the conductive rod 35 and the connector 9. And, the circuit board 21 is fixed to the leading ends of the pins 25, 26 by tightening screw members 27, 27.

The conductive rods 35, the pins 25, 26 and the connectors 9 which are used to fix the circuit board 21 supply power from the power source to the control system 20 and also serve as a route to supply the power to the motor as will be described afterward. Therefore, as compared with a case where the members for fixing the circuit board 21, the cables for connecting the power source with the control system 20 and the cables for electrically connecting the control system 20 with the motor are used, the number of parts is small and the mounting space is small. Accordingly, the brushless DC motor 1 can be made small. And, assembling can be made with ease.

The support posts 43 penetrate through the circuit board 22. The circuit board 22 is pushed toward the base end by energizing means, namely springs (coil springs) 28, to engage with the steps 44 formed on the support posts 43, thereby being supported with a certain distance away from the circuit board 21. In this case, the respective springs 28 are inserted into the respective support posts 43 having the steps 43 and compressed between the circuit board 21 and the circuit board 22. Thus, the circuit board 22 is kept engaged with the steps 44 of the support posts 43.

As described above, the brushless DC motor 1 of this embodiment has the circuit board 22 fixed by means of the springs 28, so that the circuit board 22 can be fixed securely without being affected by a tolerance of the circuit board. Besides, it is easy to assemble because assembling can be performed in one direction from the leading end toward the base end. And, as compared with a case where the circuit board is fixed by means of spacers and screws, a space can be made small and the brushless DC motor 1 can be made compact.

As shown in FIG. 15, projections 45 serving as means for positioning the ends of the springs 28 are formed on the base end of the circuit board 21 so as to correspond with the respective support posts 43 having the steps 44. The respective projections 45 are made of a brazing material such as solder. The projections 45 are mounted on the circuit board 21 and may not be formed on the circuit board 22.

The projections 45 serve to prevent the springs 28 from being displaced (horizontal displacement) due to vibrations or the like and stabilize the circuit board 22.

Since the projections 45 are made of a brazing material, they can be formed relatively easily on the circuit board 21.

The respective switching elements 24 are uniformly pushed from the base end to the leading end, namely against the inner face of the cover 5, by the respective corresponding support posts 43 with the circuit board 21 between them. Thus, the respective switching elements 24 are kept in contact (pressure contact) with the inner face of the leading end of the cover with the radiating sheet 29 between them. Therefore, heat produced by the switching elements 24 is transmitted to the leading end of the cover 5 through the radiating sheet 29 and radiated to the atmosphere through the radiating fins 51.

In this case, the respective switching elements 24 are uniformly pushed toward the inner face of the cover 5 by the support posts 43, so that radiation can be prevented from being deviated and can be made without fail.

As compared with a case where the circuit board and the respective switching elements are fixed to the heat sink by screws, and the motor and the circuit board (switching elements) are electrically connected by means of cables, the brushless DC motor 1 does not need a tapped hole for attaching the circuit board to the cover 5 and has high waterproofing.

Besides, it can be assembled with ease because the cover 5 does not need a tapped hole for mounting the circuit board and no cable is needed to electrically connect the motor with the circuit boards 21, 22. For example, a process to form the tapped hole is not required, wiring is not caught or terminals are not contacted while assembling, and it is not necessary to house a thick and rigid cable (power line) without interfering with another member (part).

The lid member 6 is a cylindrical member and serves to prevent water and dust from entering the motor and also serves as the support member to rotatably support the base end of the rotor 14. Specifically, a bearing support (bearing house) 61 is formed at the leading end of the lid member 6 to support a bearing 18, which is fitted into and fixed in the bearing support 61.

An insert nut (embedded member) 63 is embedded in the base end of the resin mold 4, and the lid member 6 is fixed to the resin mold 4 by tightening a screw member 62 into the insert nut 63.

The motor housed in the casing 2 has the stator (armature) 10 and the rotor 14 fitted inside the stator 10.

The stator 10 is stationarily mounted in the casing 2 and comprises the core 11 which is made of a lamination of silicon steel plates punched out into a desired shape and the coil 12 having a winding 13 wound around the core 11. A temperature sensor (thermistor) 8 capable of detecting a temperature of the motor is embedded in the coil 12.

The core 11 has an outer diameter substantially equal to the inner diameter of the cylinder 3. In this case, the core 11 is preferably inserted into the cylinder 3 with its outer periphery face in contact with the inner periphery face of the cylinder 3 in view of improving radiation.

The coil 12 is a three-phase coil formed of a U phase (a first phase), a V phase (a second phase) and a W phase (a third phase). Among these phases, one phase will be described as typical one.

The stator 10 is molded together with the cylinder 3 by the resin forming the resin mold 4. When the stator is inserted into the metallic casing of aluminum or the like for assembling as did conventionally, assembling workability becomes poor if a fitting tolerance between the inner diameter of the casing and the outer diameter of the stator is excessively small, or an air phase is formed between the casing and the stator if the fitting tolerance is excessively large, and radiation becomes poor. But, this problem can be remedied by the resin molding according to the invention. In other words, assembling workability is given priority with a tolerance between the casing and the stator increased, and the gap formed between them is filled with a resin having high heat conductivity, so that radiation is also improved.

Meanwhile, the rotor 14 is made of a lamination of silicon steel plates punched out into a desired shape and comprises a yoke 16 which has a plurality of magnetic poles, permanent magnets 17 disposed (preferably embedded) in the yoke so to correspond with respective magnetic poles, and the rotating shaft 15 which is fitted into the center of the yoke 16.

The rotating shaft 15 is rotatably supported by the bearing 18 which is fitted into the bearing support 61 and a bearing 19 which is fitted into the bearing support (bearing house) 41 formed on the leading end of the resin mold 4. In this case, the rotating shaft 15 is protruded from the base end of the casing 2, namely from the base end of the lid member 6 further toward the base end. The outer periphery face (cylindrical face of magnetic pole) of the rotor 14 is faced with the inner periphery face of the stator with a predetermined space (gap) between them.

With the casing 2 in a state mounted on the scooter body, the base end of the rotating shaft 15 is connected to the input shaft of, for example, a power transmission mechanism (not shown) having a non-stage transmission mechanism. Thus, the rotating force of the motor is transmitted to the drive wheel of the electric scooter through the power transmission mechanism to enable running.

When the permanent magnet 17 is good in magnetic properties, the brushless DC motor 1 can be made compact. Examples include rare earth magnets having rare earth elements, transition metal and boron as the basic ingredients.

Figure 16:
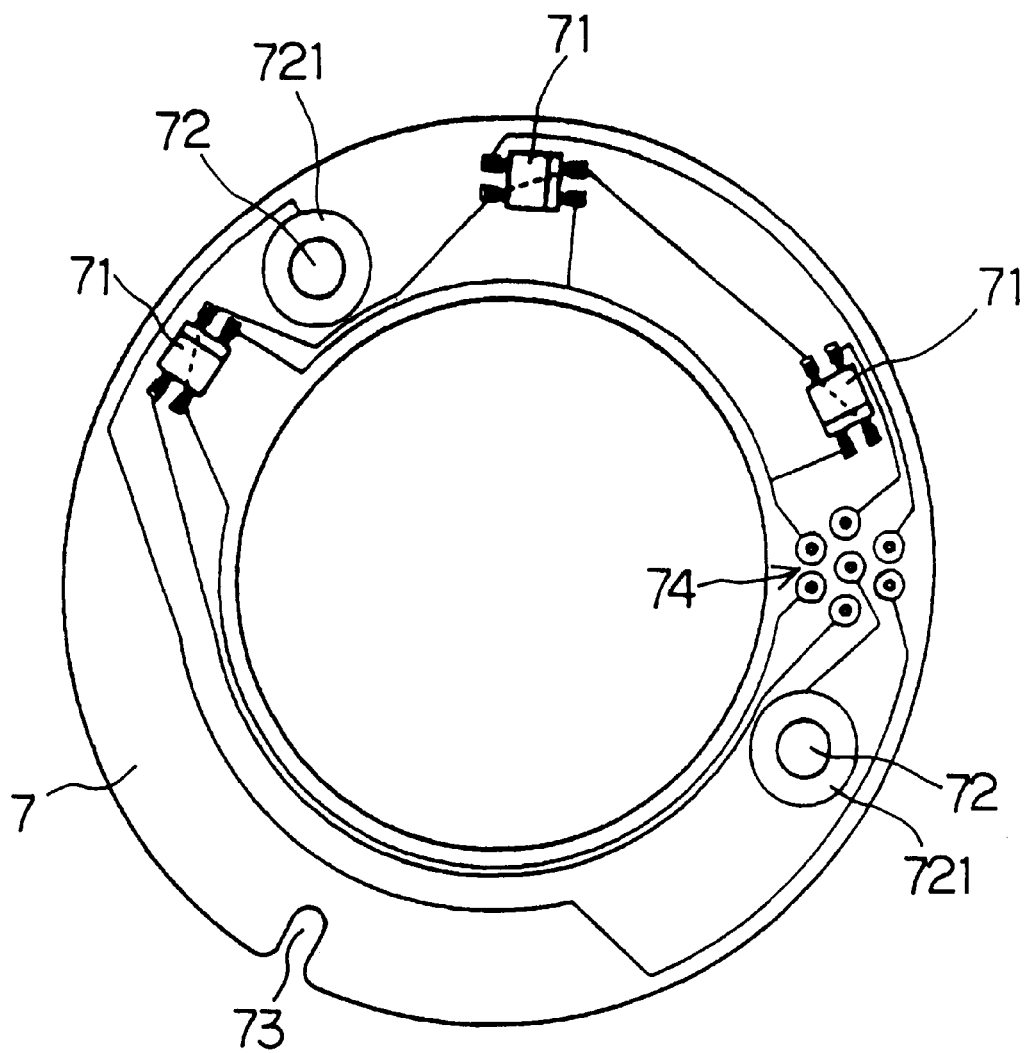
FIG. 16 is a plan view of the circuit board.

As shown in FIG. 1, FIG. 5 and FIG. 16, a ring circuit board 7, which has rotor position sensors (e.g., Hall elements) 71 for detecting a position of the rotor 14, is mounted on the base end face of the bearing support 41 of the resin mold 4. Two screw holes 72 through which screws 76 are inserted and a notch 73 for positioning of the circuit board 7 are formed on the circuit board 7. Lands (terminals) 721 made of a conductive material are formed around the base end face of the screw holes 72.

The circuit board 7 is fixed to the resin mold 4 by fixing means (two locations) comprising the screws 76 and insert nuts (embedded members) 77. Specifically, the circuit board 7 is fixed to the resin mold 4 by tightening the screws 76 passed through the screw holes 72 into the insert nuts 77 which are embedded in the neighborhood of the bearing support 41 of the resin mold 4.

Figure 17:
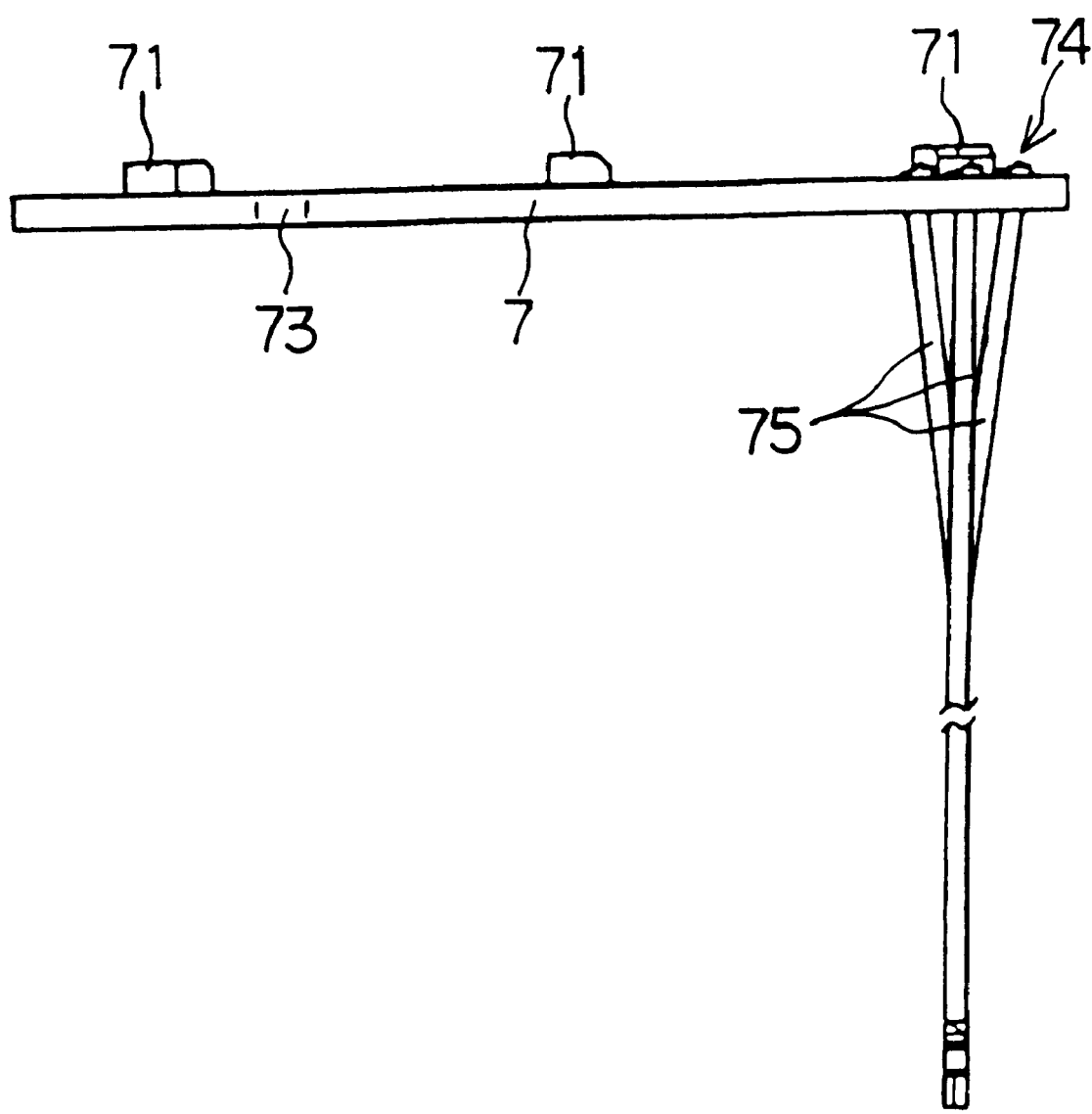
FIG. 17 is a side view of the circuit board.

And, a terminal section 74 having terminals connected to the rotor position sensors 71 and the lands 721 is formed on the circuit board 7, and the respective terminals of the terminal section 74 are connected to leads 75 extended to the back face side (leading end side) of the circuit board as shown in FIG. 17. The leads 75 are inserted into the through-hole 42 open in the axial direction and around the bearing 19, namely in the neighborhood of the bearing support 41 of the resin mold 4, and exposed to the leading end face of the resin mold 4.

Figure 18:
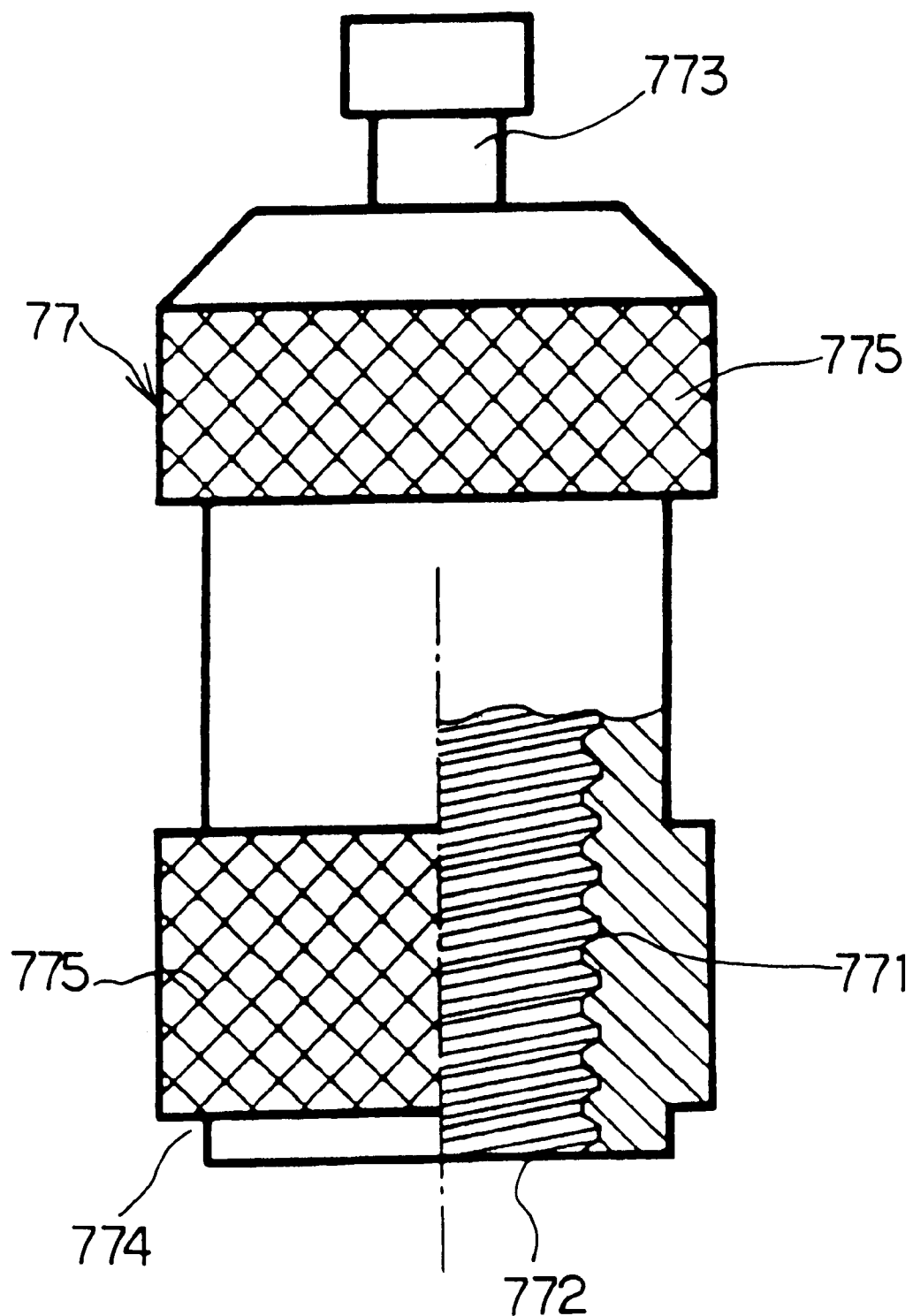
FIG. 18 is a side view showing the structure of an insert nut.
Figure 19:
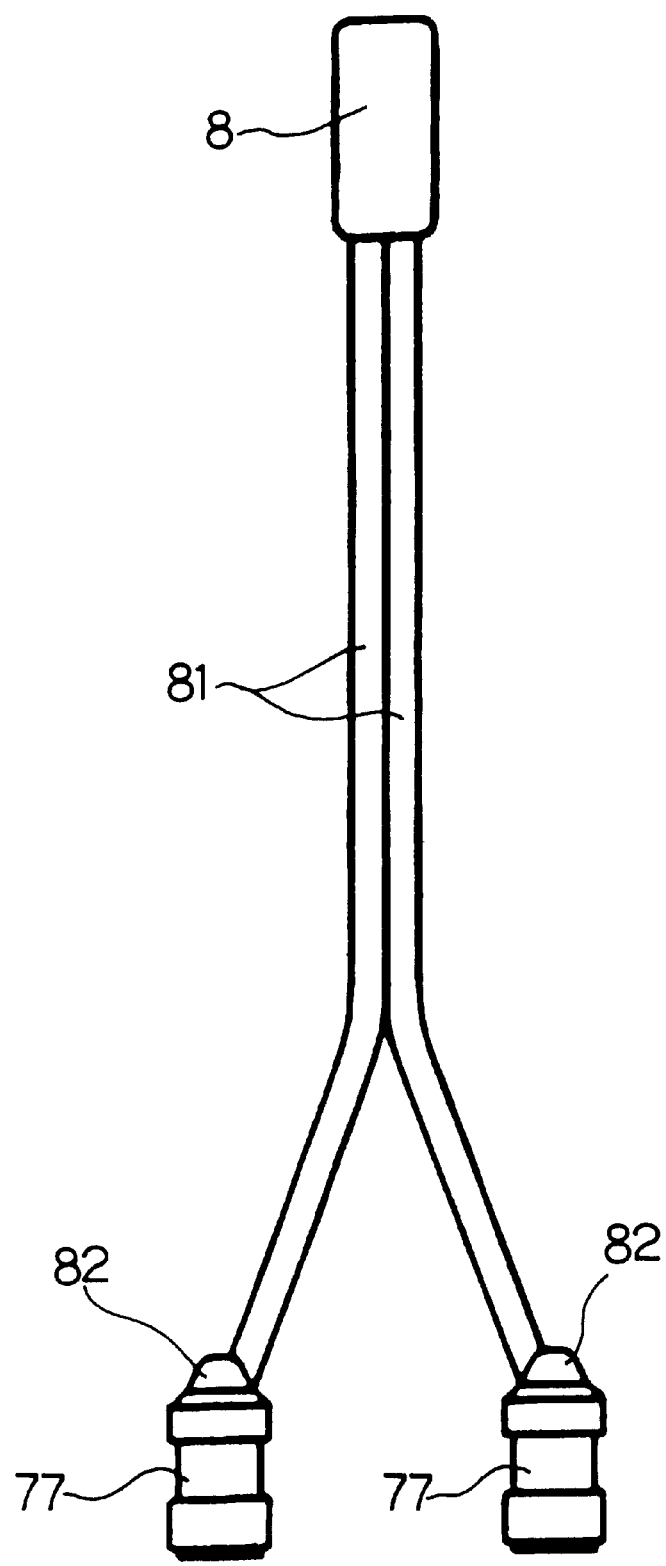
FIG. 19 is a side view showing a state that wiring is made to insert nuts.

As shown in FIG. 18, the insert nuts 77 have a female thread 771 formed in them and a small-diameter portion 773 formed on its leading end (the end opposite from an opening 772 of the tapped hole of the female thread 771). The ends of signal output lines 81 of the temperature sensor 8 are brazed (soldered) to the small-diameter portion 773 with a brazing material such as solder as shown in FIG. 19.

The small-diameter portion 773 has a contracted-diameter portion and formed into a shape easy to hold a brazing material 82. And, since it is thin, its heat capacity is small so that it easily reaches a melting point of the brazing material 82. Therefore, bonding by brazing can be made easily at a high bonding strength with a high yield. Accordingly, when the resin is injected in a manufacturing step [6] to be described afterward, the ends of the signal output lines 81 are prevented from being broken by being separated from the small-diameter portion 773 by a pressure of the resin.

And, a step (engaging face) 774 is formed on the outer periphery of the base end of the insert nut 77. This step 774 serves as mating part for engaging with an inner die 103 to securely fix (particularly, to prevent floating during resin molding) the insert nut 77 to a molding die 100 to be described afterward in resin molding. For the same reason, the same step as the step 774 or another mating part is preferably formed on the conductive rods 35, the insert nuts 63 and other embedding members.

A knurl (unevenness) 775 is formed on the outer periphery face of the insert nut 77 to keep the insert nut 77 in a state embedded in the resin mold 4 and prevent it from being come off or rotated.

A signal corresponding to the motor temperature detected by the temperature sensor 8 is taken out from the leading end of the resin mold 4 through the signal output lines 81, the insert nuts 77, the screws 76, the lands 721, a predetermined wiring on the circuit board 7, the predetermined terminals of the terminal section 74 and the leads 75.

The respective rotor position sensors 71 output a detection signal in synchronous with the passage of the permanent magnets 17 of the rotor 14, and the signal is taken out from the leading end of the resin mold 4 through the predetermined wiring on the circuit board 7 and the predetermined terminals and lines 75 of the terminal section 74.

Thus, since the detection signal provided by the temperature sensor 8 is taken out by utilizing the insert nuts 77 and the screws 76 for fixing the circuit board, the structure can be simplified by virtue of the common parts, and the wiring can be pulled out of the resin mold 4 without being affected by the position and the like of a split face.

Electrifying to the coil 12 of the stator 10 is made through the connector (embedded member) 9 embedded in the neighborhood of the shaft support 41 of the resin mold 4. The connector 9 will be described on its structure.

Figure 20:
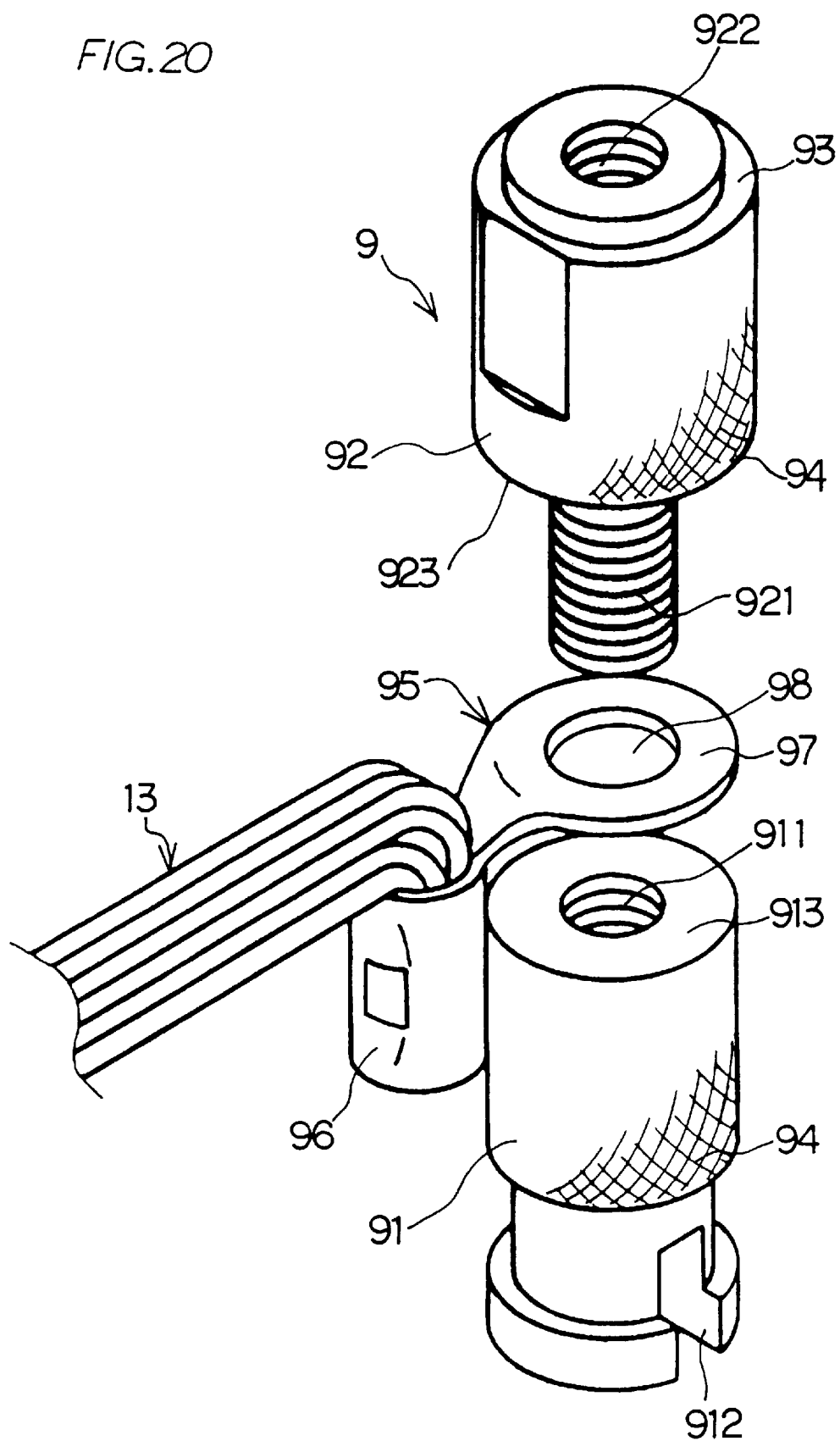
FIG. 20 is an exploded perspective view showing the configuration of a terminal member and a connector.
Figure 21:
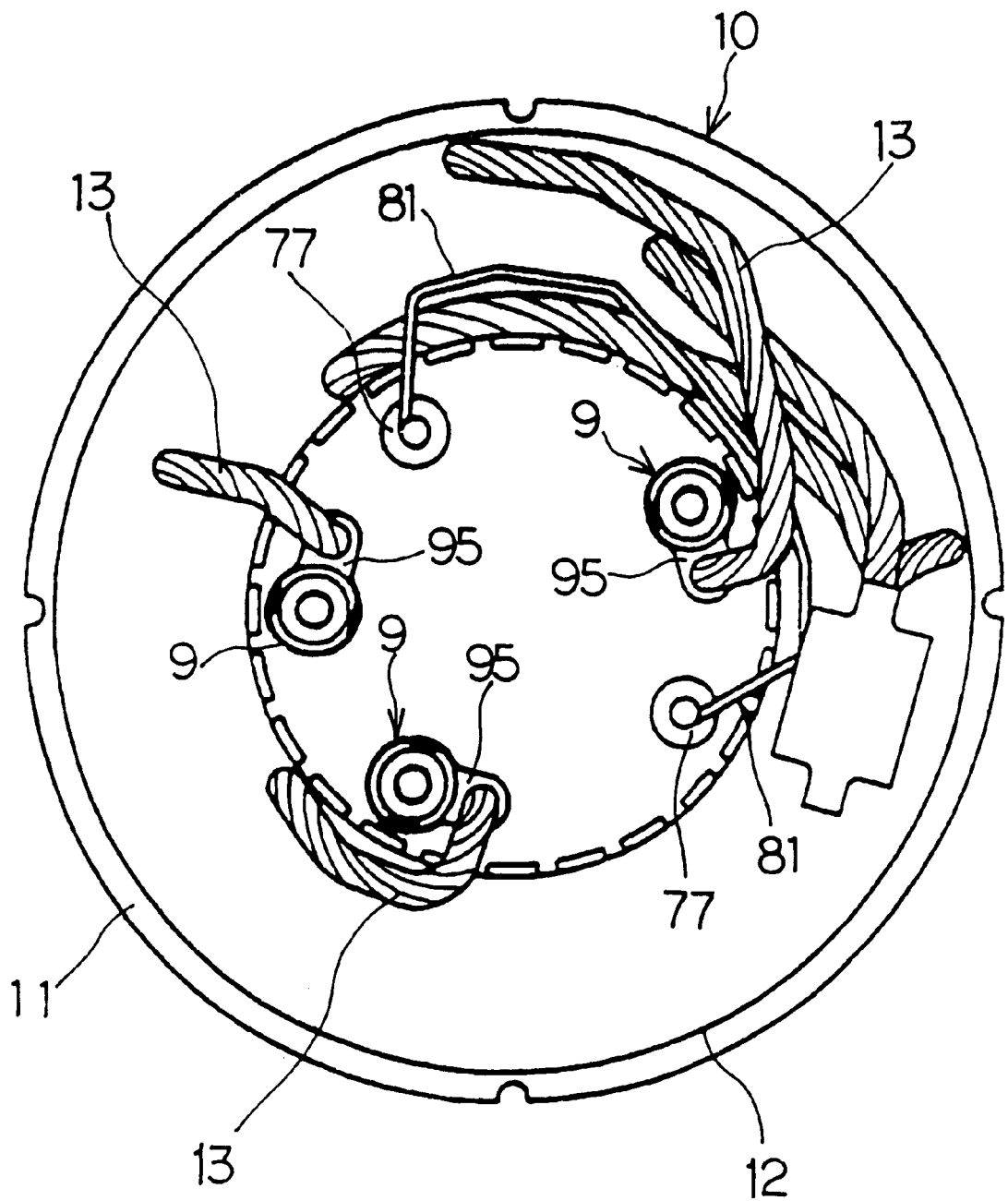
FIG. 21 is a diagram showing a stator in a state that wiring is made to connectors.

As shown in FIG. 20 and FIG. 21, the connector (lead wire connector) 9 comprises a first holding member 91 and a second holding member 92. A female thread 911 is formed on the first holding member 91. A male thread 921 is formed on the base end of the second holding member 92 so to engage with the female thread 911 and, a female thread 922 is formed on the leading end thereof. The screw member 261 is threaded in the female thread 922 to connect the pin 26 therewith.

A groove 912 is formed on the end opposite from the female thread 911 of the first holding member 91. The groove 912 serves as mating part to engage with a projection 114 at the leading end of a pin 112 to be described afterward in order to prevent the connector 9 from being moved or rotated by the resin pressure during resin molding.

A step (engaging face) 93 is formed on the outer periphery face of the leading end of the second holding member 92. This step 93 serves as mating part for engaging with the base end of a movable pin 108 to securely fix (particularly, to prevent floating during resin molding) the connector 9 to the molding die to be described afterward in resin molding.

And, a knurl (unevenness) 94 is formed on the outer peripheries of the first holding member 91 and the second holding member 92 to keep the connector 9 in a state embedded in the resin mold 4 and prevent it from being come off or rotated.

On the other hand, a terminal member (crimping terminal) 95 is mounted on the end of winding 13. The terminal member 95 comprises a cylindrical crimping part 96 and a ring plate 97 integrally formed with the crimping part 96. The end of the winding 13 is held by the crimping part 96 so as to be fixed by being crimped. And, the plate 97 is bent at substantially 90 degrees with respect to the axis of the crimping part 96. And, a circular opening 98, in which the male thread 921 of the second holding member 92 is inserted, is formed at the center of the plate 97.

The male thread 921 of the second holding member 92 is inserted into the opening 98 of the plate 97, the second holding member 92 is rotated in a predetermined direction with respect to the first holding member 91 so to engage the male thread 921 with the female thread 911 of the first holding member 91. Thus, the first holding member 91 and the second holding member 92 come to close to each other to hold and fix the plate 97 of the terminal member 95 between holding faces 913, 923.

Since the plate 97 is bent at substantially 90 degrees with respect to the axis of the crimping part 96, the crimping part 96 extends in the axial direction. And, the terminal member 95 is prevented from being deformed or broken due to the resin pressure, and the end of the winding 13 is prevented from being broken by being separated from the crimping part 96 during resin-injecting in a manufacturing step [7] to be described afterward.

In this embodiment, the first holding member 91 and the second holding member 92 are made of a material having different electrical conductivity. Specifically, the first holding member 91 is made of inexpensive brass, while the second holding member 92 is made of oxygen-free copper (OFC) having a higher electrical conductivity than brass. Since a current is flowed to the coil 12 via the second holding member 92 and the terminal member 95, the connector 9 having good electrical conductivity can be obtained without increasing part cost by using an inexpensive material for the first holding member 91 and a material having a high electrical conductivity for the second holding material 92.

The terminal member 95 is also preferably made of a material having the high electrical conductivity, such as oxygen-free copper.

Using the connector 9 described above, a power supply route to the coil 12 can be secured at the leading end of the resin mold 4 without being affected by a position of the die split face 104 to be described afterward. And, the connector 9 is located in the neighborhood of the bearing support 41 and its leading end has a height substantially equal to the leading end of the coil 12, so that the connector 9 can be embedded in a small space of the resin mold 4 without forming a projection in the radial direction or the axial direction. As a result, the brushless DC motor 1 can be made compact.

As described above, the three connectors 9 are embedded in the neighborhood of the bearing support 41 of the resin mold 4 and the single through-hole 42 is formed. The respective connectors 9 and the through-hole 42 are formed in substantially an equal distance from the rotating center O of the rotor 14 (see FIG. 6). And, the outer periphery of the connector 9 and the inner periphery of the through-hole 42 are preferably made substantially the same. Thus, distortion of the bearing-fitting hole of the bearing support 41 due to the contraction of the resin is made uniform, and dimensional precision is improved.

Figure 22:
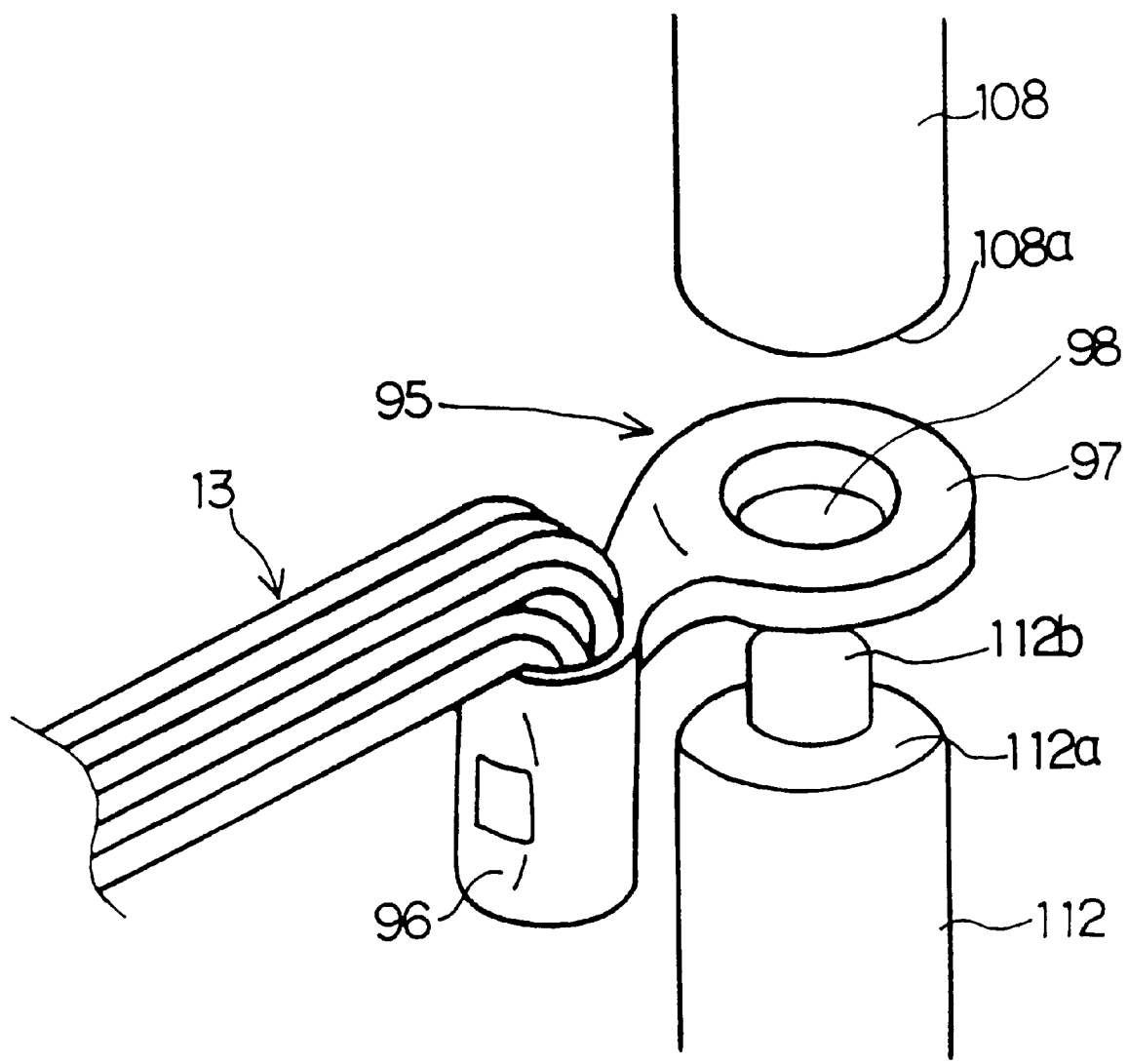
FIG. 22 is an exploded perspective view showing the structure that a flat part of the terminal member is held between a pin and a movable pin.

FIG. 22 shows that the plate 97 of the terminal member 95 is held between the pin 12 and the movable pin 108 and molded. Specifically, a projection 112b formed on an end face 112a of the pin 112 is passed through the opening 98 of the terminal member 95 and engaged with a mating part (not shown) of the movable pin 108 to hold the plate 97 of the terminal member 95 between the end face 112a of the pin 112 and the end face 108a of the movable pin 108. Since the pin 112 and the movable pin 108 are securely connected, the male thread 921 and the female thread 911 formed as described above are not required.

Figure 23:
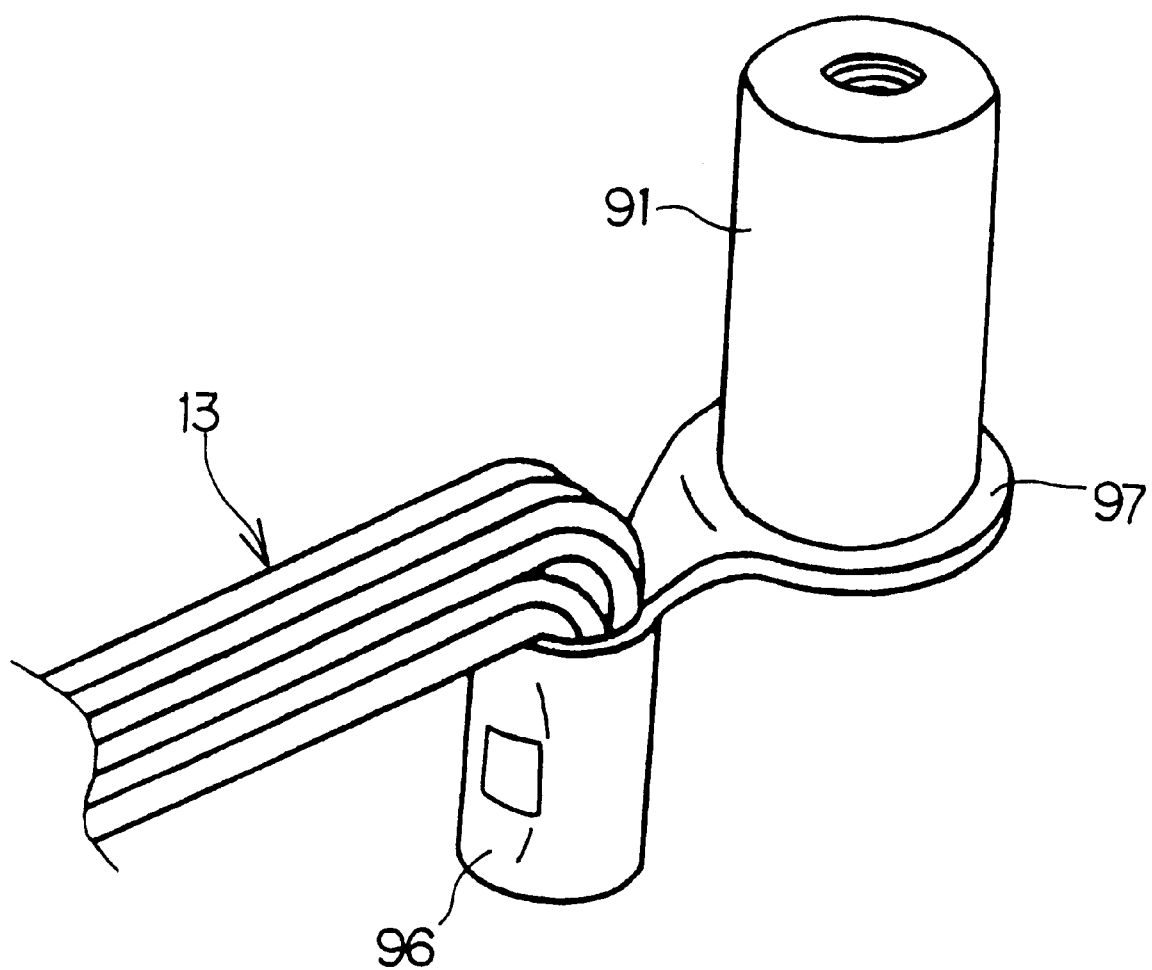
FIG. 23 is an exploded perspective view showing another structure of the terminal member and the connector.

FIG. 23 shows another embodiment of the connector 9. This connector 9 has the plate 97 of the terminal member 95 integrally fixed to the lower end of the first holding member 91 by welding. In this case, it is not necessary to hold the plate 97 of the terminal member 95 between the pins, so that workability is improved.

Power from a power source (not shown) is supplied to the control circuit (including the inverter circuit) on the circuit board 21 via the conductive rod 35, the pin 25 and the screw member 27 and further supplied to the respective phases of the coil 12 via the screw member 27, the pin 26, the connector 9 and the terminal member 95. Accordingly, the core 11 is excited, and torque is produced in the rotor 14. In this case, electrifying the coil 12 is controlled by the control system 20 according to the detection signal produced by the rotor position sensor 71.

The brushless DC motor 1 described above is mounted on the scooter body with the base end of the ribs 31 by means of, for example, bolts. In this case, the connection between the scooter body and the base end face of the cylinder 3 is waterproofed and dust-proofed as required. To effect the waterproofing and dust proofing, a sealing member having, for example, fluid-tightness is interposed. This sealing member may be a ring-shaped member made of a rubber-like elastic material, the liquid gasket, or a hardened adhesive agent.

Figure 24:
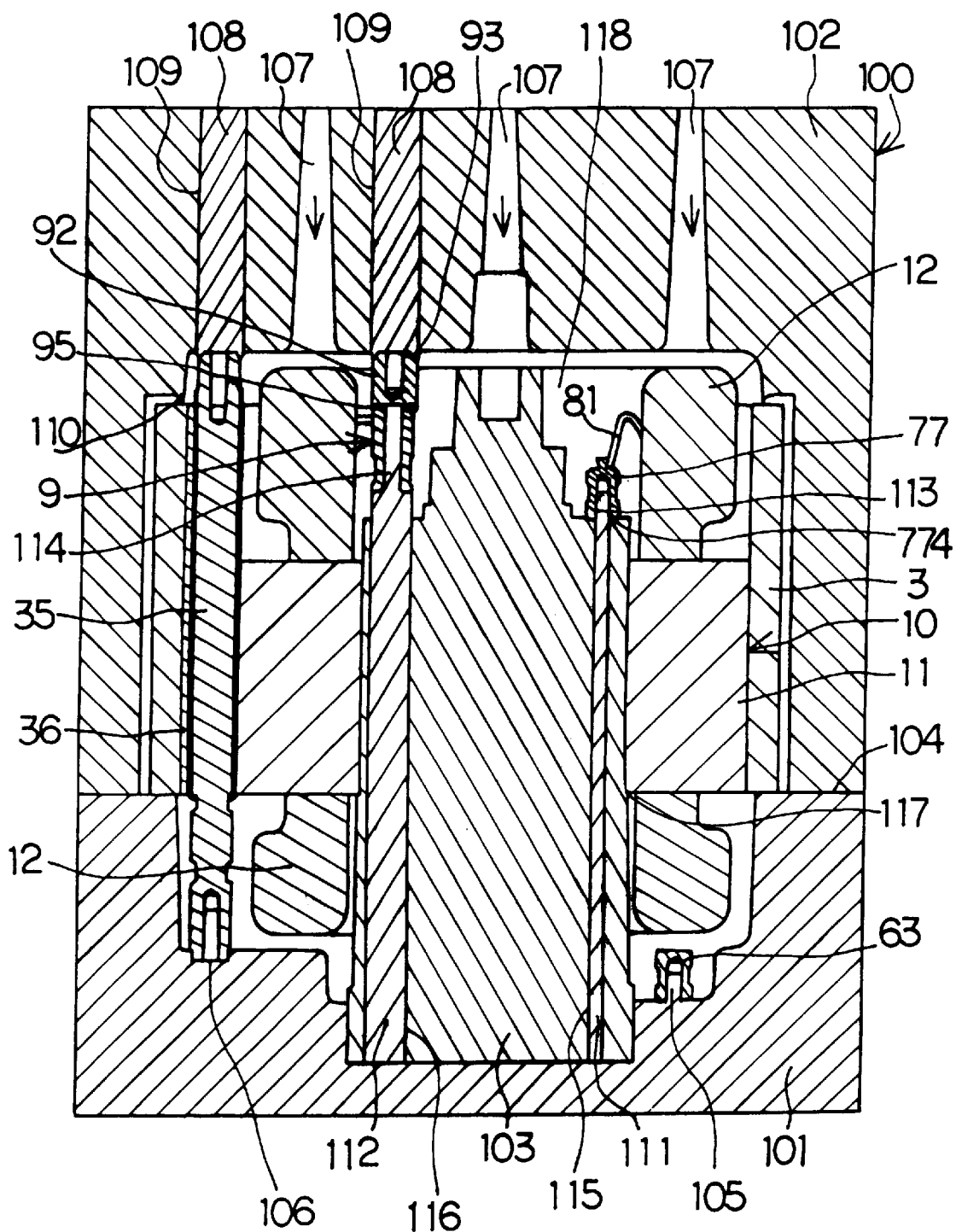
FIG. 24 is a sectional view showing a method of manufacturing the motor of the invention.

Now, a method of manufacturing the brushless DC motor 1 will be described with reference to FIG. 24.

First, the molding die 100 is used to manufacture the major parts of the casing 2. The molding die 100 comprises mainly a lower die (first die) 101, an upper die (second die) 102 which is connected with the lower die 101 with the die split face 104 therebetween, and the inner die (third die) 103 which is positioned between the lower die 101 and the upper die 102 and inserted in substantially the center thereof. The inner die 103 has its base end fixed by being fitted into the lower die 101.

The lower die 101 has a projection 105 which is inserted into the tapped hole of the insert nut 63 to fix the insert nut and a mating recess 106 with which the base end of the conductive rod 35 is engaged.

The upper die 102 has injection passages (gates) 107 into which the resin is injected, insertion holes 109 into which the movable pins (fixing members) 108 are inserted to fix the conductive rod 35 and the connector 9, and a support 110 which supports by pressing the cylinder 3 with the lower die 101. The support posts 43 are formed of the resin charged into the injection passages 107.

Insertion holes 115, 116, into which the pins (fixing members) 111, 112 are inserted, are formed in the inner die (center shaft) 103. The leading ends of the pins 111, 112 are protruded out of the inner die 103, and the projections 113, 114 are fitted into the tapped hole of the female thread 771 of the insert nut 77 and the groove 912 of the connector 9 to fix them.

The pin 111 serves to make positioning of the insert nut 77 and prevent the resin from penetrating from the base end. The pin 112 serves to make positioning of the connector 9. The movable pins 108 serve to prevent the connector 9 from floating and position its axial direction, and also prevent the resin from entering from the leading end.

And, the pins 111, 112 are located around a part of the inner die 103, which resin-molds the bearing support 41.

The input/output lines of parts to be embedded into the resin mold 4 such as the ends of the winding 13 and the output lines 81 of the temperature sensor 8 were conventionally pulled out in the state of lines from the resin mold 4. And, the lines were pulled out crossing the die split face. Specifically, a groove was formed on a part of the die split face to prevent the resin from flowing out during molding, and the input/output lines were placed in the groove before resin molding. As a result, it was necessary to make the split shape of the die complex so that the die split face agrees with the location where the input/output lines are pulled out, making it hard to fabricate the die. And the input/output lines, particularly those having a small line diameter such as the signal output line 81, might be broken when the dies are separated.

On the other hand, since the present invention uses the pins 111, 112 and the movable pins 108 to fix the connector 9 and the insert nut 77, the part which comes in contact with the die is a metal having high rigidity, so that the lines are not broken when the dies are separated. And, since the input/output lines do not cross the die split face 104, the input/output lines can be pulled out, namely the electric signal can be input and output via the embedded members, without being affected by the location of the die split face 104. Therefore, the die split shape is not required to be made complex for the reasons described above.

In the brushless DC motor 1 of this embodiment, the control system 20 for controlling the motor at the leading end of the resin mold 4 can be connected with the connector 9 in the shortest length by means of the pin 26, and the motor efficiency can be improved. Besides, since the connector 9 and the insert nut 77 can be embedded in the locations determined by the die, accuracy of mounting other parts such as the pin 26 and the circuit board 7 into such embedding locations is improved.

A step-shaped engaging part 117 is formed on the outer periphery of the inner die 103, to make positioning of the axial direction of the core 11.

Now, a manufacturing step of the brushless DC motor 1 will be described.

[1] The temperature sensor 8 having the insert nut 77 brazed with the signal output line 81 is inserted into the coil 12. And, the terminal member 95 of each phase of the coil 12 is held by the connectors 9 to keep in electrical connection.

[2] The insert nut 63 is fitted to dispose on the projection 105 of the lower die 101.

[3] The stator 10 is fitted down until the inner periphery of the base end of the core 11 is engaged with the engaging part 117 of the inner die 103. The connectors 9 of respective phases of the coil 12 are fixed by being mated with the corresponding projections 114 of the die, and the respective insert nuts 77 are also disposed in engagement with the corresponding projections 113.

[4] The cylinder 3 is fitted to the outer wall of the stator 10 until its base end comes in contact with the die split face 104 of the lower die 101. And, the conductive rod 35 is inserted into the cylinder 3 to have the base end fitted into the mating recess 106.

[5] The upper die 102 is fitted to the lower die 101 so that the die split faces 104 are tightly contacted mutually. Thus, the cylinder 3 is fixed by being pushed by the support 110 and the die split face 104 of the lower die 101, and a cavity 118 is formed by the lower die 101, the cylinder 3, the upper die 102 and the inner die 103. At this time, the base ends of the respective movable pins 108 fitted to the upper die 102 are mated with the leading end (the step 93) of the connector 9 and the leading end of the conductive rod 35. Accordingly, the connector 9 is fixed by being pushed by the projection 114 and the base end of the movable pin 108, and the conductive rod 35 is fixed by being pushed by the mating recess 106 and the base end of the movable pin 108.

[6] The molten resin is poured into the cavity 118 through the injection passages 107 of the upper die 102. For example, when a polyester-based resin is used, it is preferable that the die temperature is about 130° C, to 140° C., the resin temperature is also the same, and a pouring pressure is about 80 to 120 kg/cm2. After the lapse of a predetermined time, the charged resin hardens to form the resin mold 4 described above.

[7] The lower die 101 and the upper die 102 are separated from each other, and the cylinder 3, the stator 10 and the resin mold 4 formed into one body are removed from the inner die 103.

[8] An inner ring of the bearing 18 is fitted to the base end of the rotating shaft 15 of the rotor 14, and an inner ring of the bearing 19 is fitted to the leading end of the rotating shaft 15.

[9] The circuit board 7 is fixed in the neighborhood of the bearing support 41 of the resin mold 4 by tightening the screws 76 into the respective screw holes 72 of the respective insert nuts 77 having the openings 772 exposed.

[10] A wave washer is fitted to the bearing support 41 of the resin mold 4 to give a pre-pressure to the bearing, and an outer ring of the bearing 19 which is mated into the rotor 14 is inserted therein. Then, the lid member 6 is fitted to the base end of the resin mold 4 so that the bearing 18 is inserted into the bearing support 61 of the lid member 6, and the screw member 62 is tightened into the insert nut 63 to fix the lid member 6.

[11] The pins 25, 26 are connected to the leading ends of the conductive rod 35 and the connector 9, which are exposed to the leading end face of the resin mold 4.

[12] The circuit board 21, which has the switching elements 24 mounted on the leading end side and the electrolytic capacitors 23 mounted on the base end side in the arrangement as described above, is prepared, and the circuit board 22, which has the other component parts of the control system 20 mounted, is also prepared in advance. Predetermined wiring is made between the circuit board 21 and the circuit board 22. And, the radiation sheet 29 is formed on the top face of each switching element 24.

[13] The circuit board 22 is fitted to the support posts 43, the springs 28 are then fitted, and the circuit board 21 is fixed at the leading ends of the pins 25, 26 by means of the screw members 27.

[14] The cover 5 is fitted to cover the control system 20, and the bolts 52 are tightened to fix the cover 5 to the cylinder 3. The interface between the cylinder 3 and the cover 5 is waterproofed and dust-proofed as required.

The brushless DC motor 1 is completed as described above. The brushless DC motor 1 is assembled by stacking the parts in the direction from the leading end to the base end.

As described above, the brushless DC motor of the invention has been described with reference to the embodiments shown in the drawings, but the invention is not limited to the brushless DC motor.

And, the motor of the invention is not limited to be used for the electric scooters and electric vehicles but may be used for any other purposes.

The brushless DC motor described above has the motor and the control system for controlling to drive the motor housed in the casing, so that it can be assembled and mounted with ease and has high reliability.

And, since the common parts are used, the configuration can be made simple, the brushless DC motor can be made compact, and the manufacturing cost can be reduced.

Especially, when the radiation fins are formed on the part of the casing covering the control system, it is advantageous in space saving because the radiating route of heat produced by the motor and that of heat produced by the control system are formed of the same member.

And, when power from the power source is supplied to the control system through the conductive rods and the output from the control system is conducted to the coil through the connectors, the circuit board can be electrified through and fixed by the conductive pins with respect to the conductive rods and the connectors. Therefore, the number of parts can be reduced, and the brushless DC motor can be made compact.

Where the center angle $\theta 1$ between the first connector and the second connector with respect to the center of a circle is set to $150\pm10°$, the center angle $\theta 2$ between the first connector and the third connector with respect to the center of the circle is set to $150\pm10°$, or the switching elements of the control system are disposed in the form of a circular on the circuit board, the components on the circuit board can be arranged advantageously for making the control system compact and intensive, and the brushless DC motor can be made compact.

Where the stationary member is disposed, the respective switching elements can be mounted on the circuit board as a single unit, and where the conductive rod is disposed, a cable can be omitted, and assembling and mounting can be made simple.

And, the conductive rod minimizes the exposure of the lead or the like to the inside or outside of the casing, so that the line is prevented from being broken and reliability is improved.

Besides, since the brushless DC motor can be assembled in one direction from the leading end to the base end, assembling can be automated.

INDUSTRIAL APPLICABILITY

The invention has a motor and a control system for controlling to drive the motor housed in a casing, so that assembling and mounting can be made with ease and reliability is high. Therefore, it is advantageously used as the drive source for carrying vehicles such as electric scooters and electric vehicles.

What is claimed is:

1. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the control system has a first circuit board and a second circuit board which are disposed to face with each other, a coil spring is provided between the first circuit and second circuit boards, the first circuit board is fixed to the first and second conductive pins by means of screws, and the second circuit board is pushed by the coil spring in a direction away from the first board.

2. The motor as set forth in claim 1, wherein the first circuit board is provided with a positioning member for positioning the end of the coil spring.

3. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the control system has a first circuit board and a second circuit board which are disposed to face with each other, the first circuit board is fixed to the first and second conductive pins by means of screws and supported to the casing by the first and second conductive pins, an energizing means is disposed to push the second circuit board in a direction away from the first circuit board, the energizing means is a spring, the first circuit board is provided with a positioning member for positioning the end of the spring, and the positioning member is a projection made of a brazing material formed on the first circuit board and (or) the second circuit board.

4. The motor as set forth in claim 3, wherein the casing has a projection which has an engaging part to engage with the second circuit board, the spring is a coil spring which is inserted into the projection and in a compressed state between the first circuit board and the second circuit board, and the second circuit board is pushed by the coil spring so that it is kept in engagement with the engaging part.

5. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the circuit boards are fixed to the first and second conductive pins by means of screws, the casing is provided with a metallic heat sink, the circuit board is provided with a plurality of switching elements, and the respective switching elements are pushed by pushing means through the circuit board and kept in press-contact with the inner face of a metallic heat sink with a radiation sheet interposed between them, the pushing means being formed of a plurality of support posts which are erected corresponding to the respective switching elements.

6. The motor as set forth in claim 5, wherein the casing is formed by resin molding and the plurality of support posts are integrally formed with the casing by the resin molding.

7. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the circuit boards are fixed to the first and second conductive pins by means of screws, and the casing has the stator and a metallic cylinder accommodating the stator therein molded by resin which has a thermal expansion coefficient smaller than that of the material for the cylinder.

8. The motor as set forth in claim 7, wherein the cylinder has a mount for mounting the casing to another location and a mount for mounting the metallic heat sink to the casing, and the heat sink is fixed in contact with the cylinder.

9. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the circuit boards are fixed to the first and second conductive pins by means of screws, and the casing has a pair of conductive rods which are fixed by fixing means electrically insulated from the casing, the rotor has a rotating shaft which is protruded from one end of the casing, a terminal to be connected with a power source is formed on the ends of respective conductive rods which are on the same side of the protruded end of the rotating shaft, and a terminal to be connected with the first conductive pin is formed on the end opposite from the projected end of the rotating shaft.

10. The motor as set forth in claim 9, wherein the electrically insulated fixing means is formed by resin molding.

11. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the circuit boards are fixed to the first and second conductive pins by means of screws, and the stator has a core and a coil which is formed by having winding on the core, a connector is connected with the end of the winding, the connector is fixed to the casing by the electrically-insulated fixing means, and a terminal, which is connected with the second conductive pin, is formed on the end of the connector on the side opposite from the projected end of the rotating shaft.

12. The motor as set forth in claim 11, wherein the coil comprises a first phase, a second phase and a third phase, the connector comprises a first connector connected with the first phase, a second connector connected with the second phase and a third connector connected with the third phase, the first to third connectors are mounted on substantially the same circumference of the same circle, a center angle $\theta 1$ between the first connector and the second connector with respect to the center of the circle is and a center angle $\theta 2$ between the first connector and the third connector with respect to the center of the circle is $150 \pm 10°$.

13. The motor as set forth in claim 11, wherein the connector is fixed in the neighborhood of a bearing support for the rotor of the casing, by the electrically insulated fixing means.

14. The motor as set forth in claim 13, wherein the electrically insulated fixing means and the bearing support are formed by resin molding.

15. The motor as set forth in claim 14, wherein a through-hole is formed in the neighborhood of the bearing support to run a signal output line for a signal to detect the rotor position, the through-hole is formed by a die when the resin molding is effected, and its inner diameter is substantially equal to the outer diameter of the connector.

16. The motor as set forth in claim 11, wherein the connector comprises a terminal member connected with the coil, a first holding member having a female thread, and a second holding member having a male thread to mate with the female thread, the terminal member has a flat part, and the male thread is mated with the female thread to hold the flat part between the first holding member and the second holding member.

17. The motor as set forth in claim 16, wherein the first holding member and the second holding member are each made of a material having a different electrical conductivity.

18. A motor comprising a drive system which has a stator and a rotor, and a control system which controls the drive system and has circuit boards, both being housed in a casing, characterized in that:

the casing has a first conductive pin for flowing an input current to the control system and a second conductive pin for flowing an output current from the control system to respective phases of a coil, the circuit boards are fixed to the first and second conductive pins by means of screws, the casing has a stator which is molded with a resin, a sensor board which has a sensor for detecting a position of the rotor, a temperature sensor which is embedded in the resin and a fixing means which fixes the sensor board to the casing, the fixing means comprises an insert nut which is embedded in the resin and a screw which is mated with the insert nut, the signal output line of the temperature sensor is connected with the insert nut, and a current is flown to the terminals on the sensor boards through the insert nut and the screw.

19. The motor as set forth in claim 18, wherein the insert nut is embedded in the neighborhood of the bearing support for a bearing to rotatably support the rotor.

20. The motor as set forth in claim 19, wherein the insert nut has a small-diameter portion at its end on the side opposite from the opening of the tapped hole, and the signal output line is brazed to the small diameter portion.

21. A motor comprising a drive system which has a stator and a rotor, and a control system which controls the drive system and has circuit boards, both being housed in a casing, and a plurality of switching elements being mounted in a circular form on the circuit boards, characterized in that:

the switching elements have a terminal group protruding to one end, and the terminal groups are formed to be alternately directed to the inner and outer peripheries of the circuit boards, thus minimizing the space for the terminal groups.

22. A motor comprising a drive system which has a stator and a rotor, and a control system which controls the drive system and has circuit boards, both being housed in a casing, and a plurality of switching elements being mounted in a circular form on the circuit boards, characterized in that:

the switching elements have a terminal group protruding to one end, the terminal groups are formed to be alternately directed to the inner and outer peripheries of the circuit boards, and the respective switching elements are mounted on the circuit boards by a fixing member which is a substantially regular hexagonal ring as a whole and having a step on each side of the hexagon to determine the fixing positions of the respective switching elements.

* * * * *